(12) United States Patent  (10) Patent No.: US 8,831,755 B2
Bensoussan  (45) Date of Patent: Sep. 9, 2014

(54) SYSTEM AND METHOD FOR FEEDBACK CONTROL

(75) Inventor: David Bensoussan, Montreal (CA)

(73) Assignee: Socovar, S.E.C., Montreal (CA)

( * ) Notice: Subject to any disclaimer, the term of this patent is extended or adjusted under 35 U.S.C. 154(b) by 589 days.

(21) Appl. No.: 13/217,861

(22) Filed: Aug. 25, 2011

(65) Prior Publication Data

US 2012/0053705 A1    Mar. 1, 2012

Related U.S. Application Data

(60) Provisional application No. 61/376,872, filed on Aug. 25, 2010, provisional application No. 61/410,039, filed on Nov. 4, 2010, provisional application No. 61/423,290, filed on Dec. 15, 2010.

(51) Int. Cl.
*G05B 11/42* (2006.01)
*G05B 5/01* (2006.01)

(52) U.S. Cl.
CPC ....................................... *G05B 5/01* (2013.01)
USPC .................. 700/42; 700/28; 700/37; 706/13; 706/23; 713/300

(58) Field of Classification Search
USPC .......... 700/1, 28, 37, 42; 706/13, 23; 713/300
See application file for complete search history.

(56) References Cited

U.S. PATENT DOCUMENTS 4,639,854 A  1/1987 Kurokawa et al.
5,276,569 A  1/1994 Even (Continued)

OTHER PUBLICATIONS

Bensoussan, Decentralized control and sensitivity reduction of weakly coupled plants, Int. J. Control, 1984, vol. 40, No. 6, 1099-1118.

(Continued)

*Primary Examiner* — Kavita Padmanabhan
*Assistant Examiner* — Douglas Lee
(74) *Attorney, Agent, or Firm* — Goudreau Gage Dubuc; Hugh Mansfield

(57) ABSTRACT

A system and method for controlling a plant having a minimum phase transfer function P(s) and given an input signal u, the plant having an output y and a plant frequency range comprising a transfer function J(s) comprising the product of a high gain filter $J_1(s)$ having a gain $k_1$ sufficient that $$|J(\omega)| > \left[1 + \frac{1}{\varepsilon}\right]$$

when $|\omega| \le \omega_1$ and $|1+J(\omega)| > 1/M$ for all $\omega$ wherein $\omega_1$ is selected to obtain a desired time response, and a low pass filter $J_2(s)$ selected such that $|1+J(\omega)| > 1/M$ for all $\omega$ and J(s) is strictly proper, wherein $\varepsilon < 1$ and $M > 1$ and $\varepsilon$ and M are selected to meet a desired sensitivity requirement. An error signal e is calculated comprising the difference between the system input signal u and the plant output signal y, and the error signal modified according to the transfer function $C(s) = P^{-1}(s)J_1(s)J_2(s)$ and inputting the error signal into the plant. The system and method can be extended to unstable invertible plants. A global sensitivity bound $M \ge 1$ could also be achieved for plants including right half planes zeros. The system and method are shown applied to a read-write head positioning actuator of a hard disk drive, but can be applied equally to other systems such as electrical systems, mechanical systems, industrial processes, military applications, flight control, power generation, computer servo systems, phase lock loops and the like.

27 Claims, 20 Drawing Sheets

(56) References Cited

U.S. PATENT DOCUMENTS

| | | | |
|---|---|---|---|
| 5,625,551 A | | 4/1997 | Mitarai et al. |
| 5,726,879 A | * | 3/1998 | Sato .............................. 700/56 |
| 5,732,373 A | | 3/1998 | Endo |
| 6,204,988 B1 | | 3/2001 | Codilian et al. |
| 6,629,089 B1 | * | 9/2003 | Supino ........................... 706/23 |
| 7,007,176 B2 | * | 2/2006 | Goodfellow et al. ......... 713/300 |
| 7,117,186 B2 | * | 10/2006 | Koza et al. ...................... 706/13 |
| 2002/0111758 A1 | | 8/2002 | Wang et al. |
| 2002/0144163 A1 | * | 10/2002 | Goodfellow et al. ......... 713/300 |
| 2003/0199997 A1 | | 10/2003 | Gao |
| 2004/0030414 A1 | * | 2/2004 | Koza et al. ....................... 700/1 |
| 2009/0027118 A1 | | 1/2009 | Andersen et al. |

OTHER PUBLICATIONS

Bensoussan, Sensitivity reduction in single-input single-output systems, Int. J. Control, 1984, vol. 39, No. 2, 321-335.

Bensoussan et al., Arbitrarily fast tracking feedback systems for a class of nonlinear plants, Proceedings of the 17th IFAC World Congress, 2008, 12200-12205.

Bensoussan et al., Application of quasi-linear feedback to the control of a hard disk drive servo system, IEEE ISIE 2006, Jul. 9-12, 2006, Montréal, Canada, 307-309.

Kelemen et al., On the design, robustness, implementation and use of quasi-linear feedback compensators, Int. J. Control, Apr. 15, 2004, vol. 77, No. 6, 527-545.

International Search Report of Application No. PCT/CA2011/050517, Nov. 8, 2011.

* cited by examiner

SYSTEM AND METHOD FOR FEEDBACK CONTROL

CROSS REFERENCE TO RELATED APPLICATIONS

This application claims benefit, under 35 U.S.C. §119(e), of U.S. provisional application Ser. No. 61/376,872, filed on Aug. 25, 2010, on U.S. provisional application Ser. No. 61/410,039, filed on Nov. 4, 2010 and on U.S. provisional application Ser. No. 61/423,290, filed on Dec. 15, 2010. All documents above are incorporated herein in their entirety by reference.

FIELD OF THE INVENTION

The present invention relates to a system and method for feedback control of a system. In particular, the present invention is concerned with a feedback controller for controlling a wide variety of linear class transfer-function based plants that is simultaneously optimizable in the time and frequency domains.

BACKGROUND OF THE INVENTION

Classical control theory is concerned with improving a controlled system's performance measures in both the frequency and time domains. In particular, improvement objectives of time-domain performances generally involve decreasing rise-times, steady state error, sensitivity to plant uncertainty or external disturbances, and settling-time responses of a given linear time-invariant system. Likewise, improvement objectives in frequency-domain performances generally involve increasing phase and gain stability margins to improve the stability of a given linear time-invariant system. The introduction of a feedback controller, or compensator, to a control system loop is a manner by which to achieve these improvements.

Prior art feedback compensators employing various designs to improve system performances are numerous. The simplest form of compensation used to improve the transient response of a system is based on high gain feedback, as it is well known that increasing gain beneficially results in increased response speeds, decreased steady state error, and the like. However, high gain compensation requires a compromise between the selection of a proper gain and other acceptable performance measures. Indeed, a gain increase to a high enough extent in certain systems can lead to oscillatory behavior and instability.

In practice, the most widely used industrial compensator is a Proportional-Integral-Derivative (PID) and tuning of PID controllers to meet performance specifications is based on varying approaches. Prior art frequency response tuning techniques based on the theories of Nyquist, Bode, Evans and others are generally known to facilitate such tuning. Similarly, many time-domain tuning approaches are also provided for in the prior art. One particular approach to feedback controller tuning is the pole placement or pole assignment design method. This method entails identifying desirable poles based on the understanding of how the location of the poles in the complex S-domain influences the transient response of a controlled system and subsequently determining the feedback gain, for example the state proportional term of a PID controller, so that the closed control loop displays these required poles.

One drawback, however, is that each prior art tuning approach is optimal with respect to a selected measure of performance and a compromise between desired behavior and technical limitations must be made. For instance, the pole placement tuning method is suitable for tuning transient response performance yet is not adept at enhancing other common design specifications such as disturbance rejection, noise sensitivity and stability margins. Moreover, a PID compensator cannot secure any phase margin when the gain increases unboundedly, causing instability and oscillation, should a plant have more than three poles in excess of its zeroes. Furthermore, the addition of lead-lag compensation to speed up transient response and improve steady state response increases controller complexity when the gain is increased thus requiring a design trade-off between bandwidth performance and compensator complexity.

As a result of these shortcomings, quasi-linear compensators have been proposed. Quasi-linear compensators eliminate the contradiction between performance and compensator complexity and consequentially achieve arbitrary close to perfect tracking performance when the gain of the compensator tends to infinity (see KELEMEN Mattei, BENSOUSSAN DAVID, "*On the Design, Robustness, Implementation and Use of Quasi-Linear Feedback Compensator*", International Journal of Control, 15 Apr. 2004, Vol 77, No 6, pp 527-545) which is incorporated herein by reference. Furthermore, quasi-linear feedback compensators have been shown to have non-oscillatory time responses for high compensator gains. These benefits which quasi-linear compensators provide over linear compensators are explained by the automatic adaptation of the closed loops poles to stability and stability margins for higher system gains. However, prior art quasi-linear controllers have yet to comprehensively address all performance considerations, in particular the improvement of system rise times.

What is therefore needed, and an object of the present invention, is a quasi-linear controller that is simultaneously optimisable in the time-domain and the frequency domain, which achieves arbitrarily fast and robust tracking, improved gain and phase stability margins, improved time domain performances, and improved sensitivity of a variety of stable and unstable systems.

What is also needed is a quasi-linear compensator that applies to a large family of invertible systems that are stable and unstable and have any number of poles in excess of zeros.

SUMMARY OF THE INVENTION

In order to address the above and other drawbacks, there is provided a method for controlling a plant having a minimum phase transfer function P(s) and given an input signal u, the plant having an output y and a plant frequency range. The method comprises calculating a transfer function J(s) comprising the product of a fast time response high gain filter $J_1(s)$ having a gain $k_1$ sufficient that $$|J(\omega)| > \left[1 + \frac{1}{\varepsilon}\right]$$

when $|\omega| \leq \omega_1$ and $|1+J(\omega)| > 1/M$ for all $\omega$ wherein $\omega_1$ is selected to obtain a desired time response, and a low pass filter $J_2(s)$ selected such that $|1+J(\omega)| > 1/M$ for all $\omega$ and $C(s) = P^{-1}(s)J(s)$ is strictly proper, wherein $\varepsilon < 1$ and $M > 1$ and $\varepsilon$ and M are selected to meet a desired sensitivity requirement, calculating an error signal e comprising the difference between the system input signal u and the plant output signal y, and modifying the error signal according to the transfer function $C(s)=P^{-1}(s)J_1(s)J_2(s)$ and inputting the error signal into the plant.

There is also provided a system for controlling a plant having a transfer function P(s) which is unstable and invertible and given an input signal u, the plant having an output y and a plant frequency range. The system comprises a subtractor for calculating an error signal e comprising the difference between the system input signal u and the plant output signal y, a set of sensitivity requirements smaller than a positive number $\epsilon<1$ over a limited frequency range $\omega \leq \omega_1$ and smaller than any number M>1 over the plant frequency range, a transfer function J(s) comprising the product of a fast time response high gain filter $J_1(s)$ having a gain $k_1$ sufficient that $$|J(\omega)| > \left[1 + \frac{1}{\varepsilon}\right]$$

when $|\omega| \leq \omega_1$ and $|1+J(\omega)|>1/M$ for all $\omega$ and wherein $\omega_1$ is chosen to obtain a required time response, and a low pass filter $J_2(s)$ selected such that $|1+J(\omega)|>1/M$ for all $\omega$ and $C(s)=P^{-1}(s)J(s)$ is strictly proper. The error signal is modified according to the transfer function $C(s)=P^{-1}(s)J_1(s)J_2(s)$ prior to input into the plant.

There is also provided a controller for controlling a read-write head positioning actuator of a hard disk drive described by a transfer function P(s) and provided an input position reference signal r, the read-write head positioning actuator outputting an output position signal y. The controller comprises a subtractor for calculating an error signal e comprising the difference between the input position reference signal r and the output position signal y, a selected set of sensitivity requirements comprising $\epsilon<1$ and M>1, a transfer function J(s) comprising the product of: a high gain filter $J_1(s)$ having a gain $k_1$ sufficient that $$|J(\omega)| > \left[1 + \frac{1}{\varepsilon}\right]$$

when $|\omega| \leq \omega_1$ and $|1+J(\omega)|>1/M$ for all $\omega$ and wherein $\omega_1$ is chosen to obtain a required time response, and a low pass filter $J_2(s)$ selected such that $|1+J(\omega)|>1/M$ for all $\omega$ and $C(s)=P^{-1}(s)J(s)$ is strictly proper, wherein the error signal is modified according to the transfer function $C(s)=P^{-1}(s)J_1(s)J_2(s)$ prior to input into the plant.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

Figure 1A:
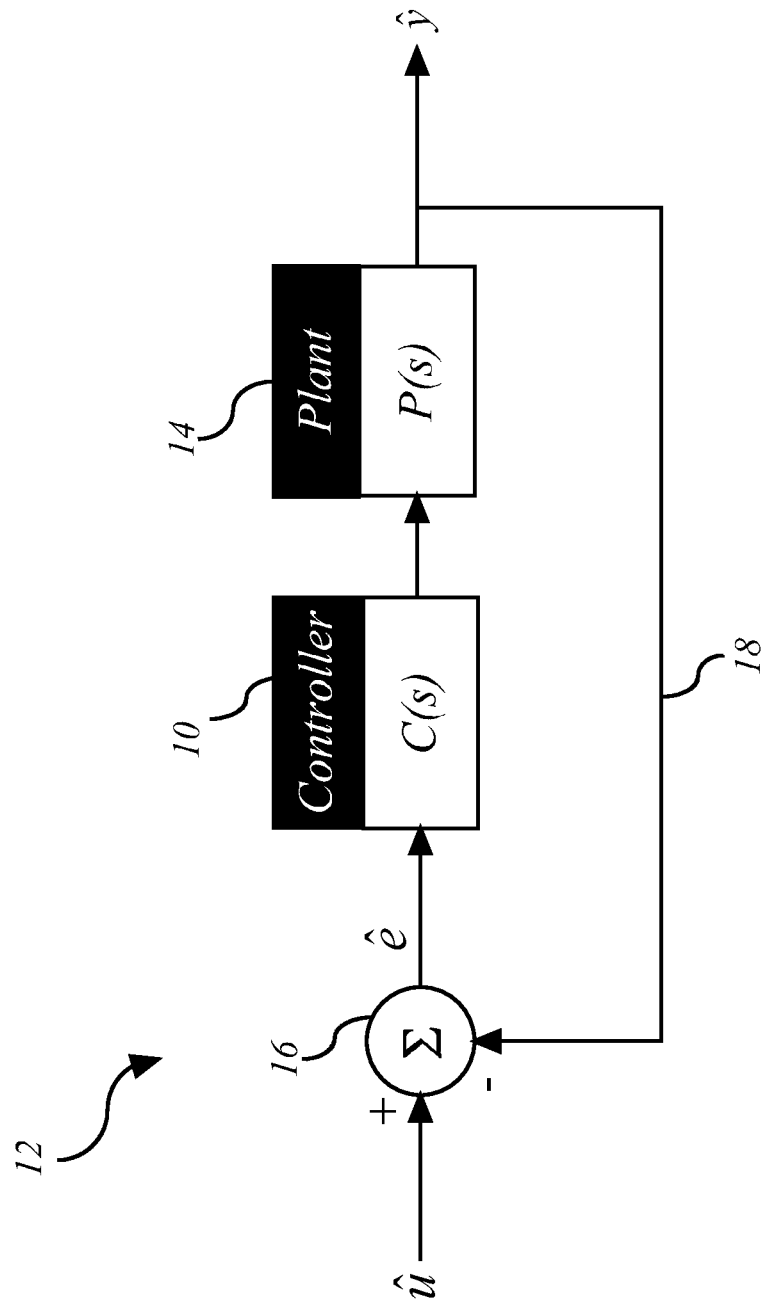
FIGS. 1A through 1E provide block diagrams of a single-input single-output feedback controlled system according to an illustrative embodiment of the present invention.

Referring now to FIG. 1A, a controller in accordance with an illustrative embodiment of the present invention and generally referred to using the reference numeral 10, will now be described in the context of a Single Input Single Output (SISO) closed-loop feedback system 12. The feedback system 12 comprises the controller 10, a plant 14, a subtractor 16, and a feedback path 18 which loops from the output of the plant 14 back to the input of the controller 10. The plant 14 is a preexisting system that does not meet all the desired frequency- and time-domain design specifications of the feedback system 12. The controller 10 is an additional system element that is added to the feedback system 12 to control the behavior of the plant 14 such that the design specifications are satisfied. In particular, the closed-loop controller 10 in accordance with an illustrative embodiment of the present invention is illustratively cascaded in series with the plant 14 to thereby control its behavior on the basis of a quasi-linear compensation technique as will be described herein below.

Still referring to FIG. 1A, the closed-loop feedback system 12 is described by the group of equations generally known in the art as:

$$\hat{y} = PC\hat{e} \qquad [1]$$

$$\hat{e} = \hat{u} - \hat{y} \qquad [2]$$

where the signals $\hat{u}$, $\hat{y}$ and $\hat{e}$ represent the Laplace transforms of the corresponding time domain functions u(t), y(t) and e(t) respectively. In particular, $\hat{u}$ is the input signal to system, $\hat{y}$ is the output signal from the plant 14, and $\hat{e}$ is the error signal representing the difference between the input signal $\hat{u}$ and the output signal $\hat{y}$ as calculated by the subtractor 16. Additionally, C(s) and P(s) are the transfer functions of the controller 10 and the plant 14, respectively.

In operation of the closed-loop feedback system 12, the output of the system $\hat{y}$ is fed back to the input of the subtractor 16 via the feedback path 18. The controller 10 then processes the error $\hat{e}$, or difference between the input signal $\hat{u}$ and the output signal $\hat{y}$, to modify the input to the plant 14 under control in a manner such that the plant meets the design performances.

Still referring to FIG. 1A, the design of the controller 10 of the present invention requires the plant 14 under consideration for compensation to be restricted to a certain class of plants having certain qualities. Generally, the plant 14 under consideration is a member of a family of invertible systems that are unstable, including a large number of industrial applications although in a particular embodiment the controller of the present invention could be used in combination with a stable or unstable plant compensated by a stable or unstable compensator in the open loop. More specifically, the application of the controller 10 is restricted to a class of plants 14 which are linear time invariant, invertible, and strictly proper. More specifically, the plant 14 is invertible if it has no right-half plane zeroes, i.e. its reciprocal $P^{-1}(s)$ is holomorphic in $\Re\, e(s) \geq 0$. As is generally known in the art, the definition of a minimum phase system is a system having neither zeros nor poles in the right-half complex plane. Accordingly, the plant 14 to which the controller 10 is applicable is limited to plants that include linear systems represented by transfer functions with stable or unstable poles and that the inverse has stable poles; linear systems represented by matrices of unstable transfer functions but the inverse of which is stable, for instance a plant having a determinant of the matrix of the transfer functions with roots located in the left-half complex plane; and linear systems for which the methods of classical control can guarantee stability for the use of high gains, including systems where the difference between the number of poles and zeros is greater than or equal to three. While the plant 14 has been exemplified as a linear system such as a hard disk drive servo system comprising a disk controller to control a drive's servo-motors and is illustratively cascaded in series after a controller 10, the controller 10 of the present invention may be applied in some instances to non-linear plants. Additionally, the controller 14 of the present invention may be applied to any number of plants 14 with high performance requirements including electrical systems, mechanical systems, industrial processes, military applications, flight control, power generation, computer servo systems, phase lock loops, and the like.

Still referring to FIG. 1A, the controller 10 of the present invention is generally employed in the feedback controlled system 12 to modify the behavior of the plant 14 so that it behaves in a specific desirable manner over time. In particular, the design objectives of the controller 10 include achieving arbitrarily fast and robust tracking, improved gain and phase stability margins, improved time domain measures and reduced rise times, and improved sensitivity of a variety of stable and unstable systems. The controller 10 achieves these performance measures simultaneously in the time-domain and the frequency-domain and does so without the tradeoffs normally associated with linear controllers.

Still referring to FIG. 1A, the controller 10 is derived from the group of controllers generally known as quasi-linear controllers. The quasi-linear controller 10 of the present invention is a controller comprising poles which depend in an appropriate way on its gain. Its advantage over linear controllers resides in that it is able to maintain the excess of poles over zeroes unaltered and allow for an increase in the loop transmission gain without jeopardizing the phase and gain stability margins.

Still referring to FIG. 1A, the design objective of the quasi-linear controller 10 of the present invention is to establish in an appropriate manner the way in which the poles of the controller 10 depend on its gain. It is generally known that a system's positioning of the poles in the complex S-plane influences performance. Poles that are positioned near to the $j\omega$-axis in the left half S-plane result in transient time domain responses that decay relatively slowly. In contrast, poles positioned in the left-half S-plane further away from the $j\omega$-axis correspond to more rapidly decaying time responses. It is also known that poles in the left-half complex S-plane lead to a stable system and poles in the right half complex S-plane lead to an unstable system. While increasing system gain is known to enhance system performance, this remains true up until a certain level of gain. If gain is increased to a high enough extent, system poles may move into the right-half complex S-plane thereby causing some systems to become unstable. Similarly, system performance may decrease as a consequence of the poles shifts.

Unlike linear controllers, the quasi-linear controller 10 of the present invention automatically adapts to stability margins with the increase of gain, thereby attaining the performance benefits normally associated with high gain feedback. This approach will allow the feedback system 12 to attain improvements in the above mentioned performance measures, particularly, improved rise times, over prior art controllers. In particular, the controller 10 of the present invention operates by pushing the pole which wanders farther away from the $j\omega$-axis with the increase in gain by appropriately relating the poles of the controller 10 to its gain. This technique is contrasted with the pole-placement technique wherein a set of desirable poles is given and the design objective is to find the feedback gain so that the closed-loop system 12 obtains the desired transient response. The approach to the controller 10 design of the present invention is converse whereby the closed loop pole behavior is determined when the controller gain is increased unboundedly.

Figure 1B:
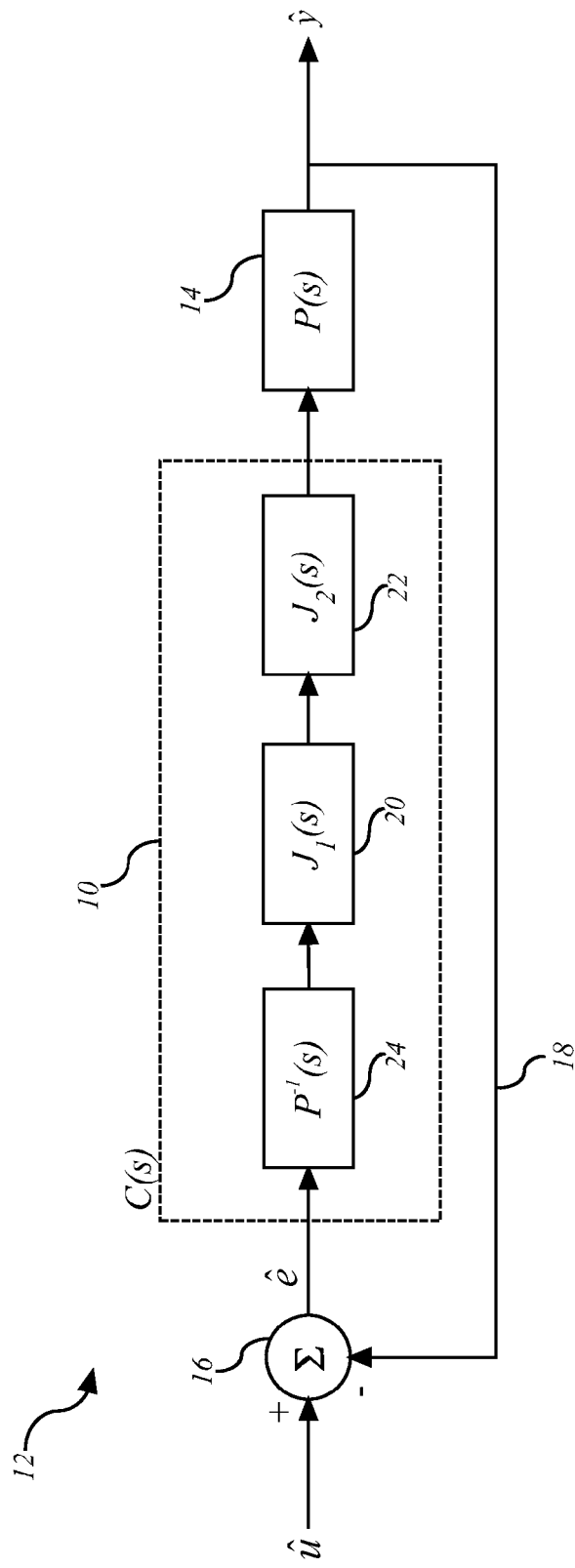

Referring now to FIG. 1B, the design conditions which ensure the performance enhancements in the time domain with correspondents in Laplace and frequency domains will now be described. The design objectives of the controller 10 take into account the time response such that the feedback gain has a dominant pole $\omega_1$ which responds to sufficiently rapid time response objectives while achieving sensitivity objectives. Let $E(\omega)$ be the sensitivity operator defines by $[1+P(\omega)C(\omega)]^{-1}$. Generally, these sensitivity objectives include the minimum sensitivity conditions within a given bandwidth, for instance $|E(\omega)|<\epsilon<1$, which does not translate into an excessive maximal sensitivity over the whole frequency range. In this sense, the sensitivity may be controlled and the system 12 is able to react sufficiently fast while remaining stable. Note that in a unity feedback system, a value of $|E(\omega)|$ close to zero in a given bandwidth which translates into a closed loop transmission close to 1 which indicates excellent tracking of the input by the output for the frequencies within this bandwidth. Also note that in a unity feedback system, boundedness of $|E(\omega)|$ ensures the boundedness of the closed loop. Stability therefore follows even when the plant is unstable and invertible (see: BENSOUSSAN, David et ZAMES, Georges, "*Control and Dynamic Systems Advances in Theory and Applications*", vol. 22, Decentralized/Distributed Control and Dynamic Systems, ISBN 0-12-012722-9, Academic Press, 1985, p. 390). Also of note, while the transfer functions of the present invention are described in terms of Laplace transforms, or in the s-domain, they may also be represented by their discrete Z-domain equivalents by choosing an appropriate sampling frequency which are generally known to be applicable to promote computational efficiency in digital implementations of the control system using standard digital control techniques such as digital signal processors, field-programmable gate arrays, application-specific integrated circuits, or the like.

Still referring to FIG. 1B, the sensitivity objectives are attained by defining the controller 10 of the following form:

$$C(s)=P^{-1}(s)J(s) \qquad [3]$$

Where $P^{-1}(s)$ represents the inverse of the given plant 14 and $J(s)$ approximates a real function in the manner now described. Writing $s=j\omega$, the values of $J(\omega)$ lie in the right-half complex plane over a frequency range given by $|\omega| \leq \omega_1$ and $J(\omega)$ will have a high gain so that the values of $P(\omega)C(\omega)$ will be kept outside the sensitivity circle centre at $(-1, 0)$, the circle comprising a radius $1/\epsilon > 1$ within the frequency range $|\omega| \leq \omega_1$. Such a design ensures that the sensitivity on the restricted frequency range $|s| < \omega_1$ is less than $\epsilon$ i.e. $\|[1+P(s)C(s)]^{-1}\|_\infty < \epsilon$. Moreover, the values of $J(s)$ will be kept outside the sensitivity circle centered at $(-1, 0)$ with radius $1/M < 1$ at all frequencies. Such a design restricts the maximal sensitivity to a value smaller than M at any frequency i.e. $\|[1+P(s)C(s)]^{-1}\|_\infty < M$.

Still referring to FIG. 1B, and assuming that the plant P(s) 14 is minimum phase, and that at high frequencies $|P(s)| > c/|s^q|$ for some constant c and integer q and frequencies $\omega > \omega_e$ the controller 10 may be reduced to the following form:

$$C(s) = P^{-1}(s)J(s) = P^{-1}(s)J_1(s)J_2(s) \quad [4]$$

wherein $P^{-1}(s)$ is the inverse transfer function of the plant P(s) 24, $J_1(s)$ is the transfer function of a high gain filter 20 having an ultra-fast time response, and $J_2(s)$ is the transfer function of a low pass filter 22 acting at a very high frequency such that the transfer function of the controller 10, C(s), remains strictly proper. In particular, the high gain filter $J_1(s)$ 20 is constructed so it satisfies the following conditions over a low frequency band:

$$|J(\omega)| > \left[1 + \frac{1}{\varepsilon}\right], \text{ where } |\omega| \leq \omega_1 \quad [5]$$

and $$\text{Re}[P(\omega)C(\omega)] > -\left(1 - \frac{1}{M}\right), \text{ for all } \omega \quad [6]$$

In a particular embodiment, $J_1(s)$ can be realized as follows:

$$J_1(s) = k_1\left(\frac{1}{s + \omega_1}\right)$$

Of note, while inequality [6] ensures a possible and acceptable maximal sensitivity reduction by the high gain filter $J_1(s)$ 20 that is easily realizable, a broader condition defined as $|1+J(\omega)| > 1/M$ may also be provided.

Still referring to FIG. 1B, in accordance with an embodiment of the present invention the low pass filter $J_2(s)$ 22 may be provided for in the general form:

$$J_2(s) = \prod_{i=1}^{k} \frac{\omega_{2i}}{(s + \omega_{2i})} \quad [7]$$

$J_2(s)$ 22 may also be represented by $\rho_2^k e^{jk\theta_2}$, that is:

$$J_2(s) = \prod_{i=1}^{k} \frac{\omega_{2i}}{(s + \omega_{2i})} = \prod_{i=1}^{k} \rho_{2i} e^{j\theta_{2i}} \quad [8]$$

In a case where the low pass filter $J_2(s)$ 22 has p repeated values $\omega_{2i}$, (i=1 . . . p) of order $r_i$ and $q_j$ (j=1, 2, . . . q) distinct values, such that $\Sigma r_i + q = k$, the low pass filter $J_2(s)$ 22 may also be expressed by:

$$J_2(s) = \prod_{j=1}^{q} \frac{\omega_{2j}}{(s + \omega_{2j})} \prod_{i=1}^{p} \left[\frac{\omega_{2i}}{(s + \omega_{2i})}\right]^{r_i} = \prod_{j=1}^{q} \rho_{2j} e^{j\theta_{2j}} \prod_{i=1}^{p} \rho_{2i}^{r_i} e^{jr_i\theta_{2i}} \quad [9]$$

Other alternative more generalized forms of $J_2(s)$ including:

Still referring to FIG. 1B and considering the filters $J_1(s)$ 20 and $J_2(s)$ 22, the frequency $\omega_1$ is chosen in a manner to obtain a fast time response $e^{-\omega_1 t}$, the gain $k_1$ is selected to be sufficiently high to ensure the condition [5] is satisfied, and the gain $k_1$ along with the frequencies $\omega_{2i}$ and the exponent k are selected to satisfy the condition [6] while ensuring that the controller C(s) 10 is strictly proper, in particular by choosing k to be greater than or equal to q.

Still referring to FIG. 1B, the design of the controller 10 also takes into account an intermediary frequency, $\omega_b \leq \omega_{2i}$ for which the real part of the polar plot $P(\omega)C(\omega)$ lies to the right of the real value $(-1+1/M)$ thus ensuring that [6] is satisfied as $P(\omega)C(\omega)$ is a decreasing function over the frequency range $\omega > \omega_b$. Increasing the cutoff frequency of [10], and the exponent k if necessary, so that [6] is satisfied would allow to evaluate such a frequency $\omega_b$. Alternatively, $\omega_b \leq \omega_{2i}$ can be chosen to be the frequency for which $|P(\omega_b)C(\omega_b)| < (1-1/M)$ and beyond which $|P(\omega)C(\omega)| < |P(\omega_b)C(\omega_b)|$. As a consequence, the time response is essentially determined by the real and negative pole $\omega_1$. Note that $\omega_1$ could be replaced by $\omega_{10}$, $\omega_{10} \geq \omega_1$ which is chosen to satisfy improved time domain performance objectives as long as the gain of the compensator at low frequency $k_1/\omega_1$ is practically realizable. A higher gain $k_1$ will result in the choice of a higher intermediate value $\omega_b$ which will result in turn in a higher value of $\omega_{2i}$ which are chosen to be superior to $\omega_b$. In this sense, the controller C(s) 10 is quasi-linear. Of note, the choice of $\omega_{2i}$ could be reduced in various manners to improve implementation, such as a reduction in energy requirements.

Still referring to FIG. 1B, the choice of $\omega_{2i}$ can be reduced by requiring:

$$\text{Re}[P(\omega)C(\omega)] > -\left(1 - \frac{1}{M}\right) \text{ for all } \omega \quad [10]$$

If $J_1(s)$ 20 is denoted by $k_1\rho_1 e^{j\theta_1}$ and $J_2(s)$ 22 by $\rho_2^k e^{jk\theta_{21}}$ i.e. $\theta_1 = \arctan(\omega/\omega_1)$ and $\theta_1 = \arctan(\omega/\omega_2)$, the following condition for the choice of $\omega_2$ is given by:

$$k_1\rho_1\rho_2^k \cos(\theta_1 + jk\theta_2) > -\left(1 - \frac{1}{M}\right) \quad [11]$$

For the low pass filter $J_2(s)$ 22 given by the form described in equation [8], the following condition for the choice of frequencies $\omega_{2i}$ is given by:

$$k_1\rho_1 \prod \rho_{2i} \cos\left(\theta_1 + \sum \theta_{2i}\right) > -\left(1 - \frac{1}{M}\right) \quad [12]$$

For the low pass filter $J_2(s)$ 22 and given by the form described in equation [9], the following condition for the choice of frequencies $\omega_{2i}$ is given by:

$$k_1\rho_1 \prod \rho_{2j} \prod \rho_{2i}^{r_i} \cos\left(\theta_1 + \sum \theta_{2j} + \sum r_i\theta_{2i}\right) > -\left(1 - \frac{1}{M}\right) \quad [13]$$

Still referring to FIG. 1B, the choice of $\omega_2$ may be illustratively reduced in an alternative or additional manner by relaxing the constraint on the maximal sensitivity value M, or in other terms by allowing for a higher sensitivity value M. Alternatively, $\omega_2$, and the exponent k if necessary, is chosen so that the Nyquist plot of $|P(\omega)C(\omega)|$ does not intersect the circle described by $(X+1)+Y=(1/M)^2$ where X and Y are the real and the imaginary axis of the same Nyquist plot, and $\omega_2$ is bigger than or equal to a frequency $\omega_b > \omega_1$ for which $|P(\omega_b)C(\omega_b)|$ intersects the circle of radius $(1-1/M)$ centered at the origin before the argument $|P(\omega)C(\omega)|$ reaches 180° as ω gets farther away from $\omega_1$. Of note, relaxing the constraint on M i.e. by taking a high value for M, allows a choice of a smaller value of $\omega_b$ and hence a smaller value of $\omega_2$. Other designs of J(s) could be implemented so that encirclements of the M circle could be accepted as long as the Nyquist criterion is satisfied. In such case, $\omega_b$ could be defined as the frequency beyond which $|P(\omega)C(\omega)|$ is a decreasing function of ω and $|P(\omega_b)C(\omega_b)|$ intersects the circle of radius $(1-1/M)$ centered at the origin before the argument reaches the negative real axis. Alternatively, the sensitivity circle M could be represented on the Nichols chart by representing the graph 20 log $[\cos\phi+\alpha((\cos^2\phi)-1+1/M^2)]$ if $\cos^2\phi>(1-1/M^2)$. The design of $\omega_2$ could proceed in a simpler manner. Or, the diagram of $J^{-1}(s)$ could be plotted, the classical M-circles (constant magnitudes of the closed loop) representing this time the sensitivity circles.

Figure 1C:
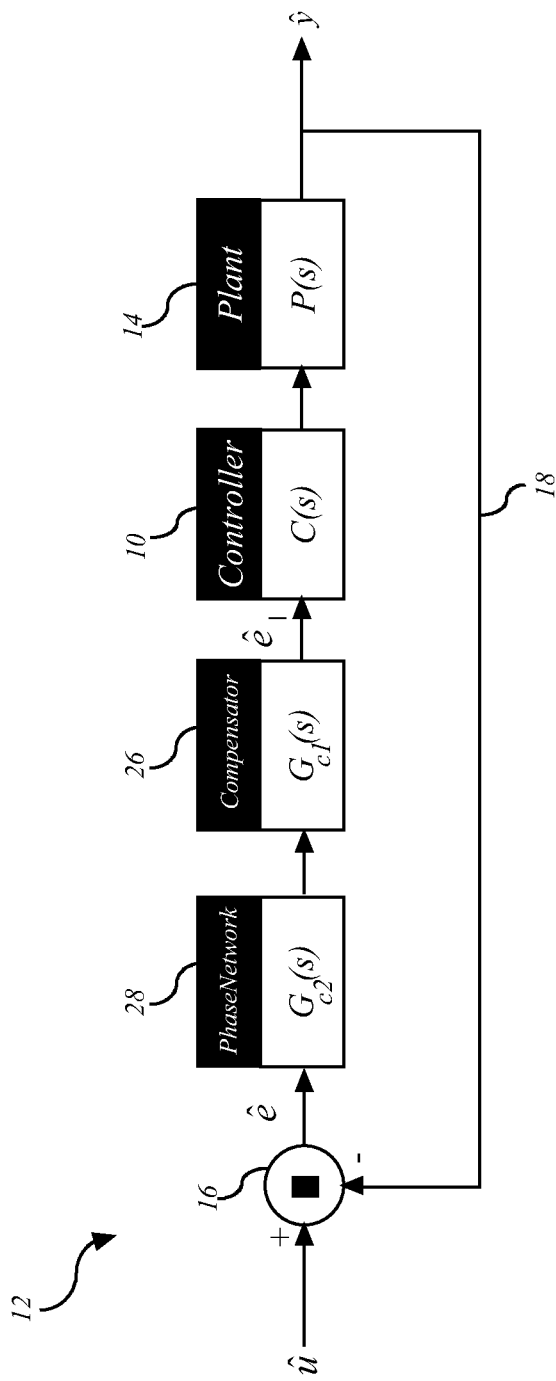

Now referring to FIG. 1C, there is disclosed an illustrative embodiment of a compensating unit 26 that is employed to improve the feedback system 12 metrics in the case of the system 12 operating outside of its proper operating range. In particular, in accordance with the exemplary illustrative embodiment of a feedback system 12 comprising such a compensating unit 26, the compensating unit 26 will adjust the phase of the system 12 when $\omega_2$ is reduced to improve implementation, in particular, when $\omega_2$ is reduced in order to reduce the energy associated with a high $\omega_2$. A decrease in $\omega_2$ has an effect of increasing the temporal response of the system 12, in particular the rise times, which can be compensated for by the addition of the compensating unit 26, $G_{c1}(s)$, which is illustratively cascaded in front of the controller 10 C(s). The compensating unit 26 illustratively comprises a chain of lead/lag compensator elements as a n phase-lead/phase lag compensator as is generally known in the art, and may take the transfer function form given by:

$$G_{c1}(s) = k_c \prod_{i=1}^{n} \frac{s+z_i}{s+p_i} \quad [14]$$

where $z_i$ and $p_i$ are respectively the zeros and the poles of the compensating unit 26. The poles and zeros of the compensating unit 26 are chosen in a manner such that the poles of the system 12 are shifted to the left to counteract both the increases in the system time responsiveness and system instabilities caused by the phase lagging effect introduced by a reduction in $\omega_2$. By providing such a compensating unit 26 within the closed system feedback loop, $\omega_2$ may be reduced while the advantages provided for by the controller 10, such as fast rise times, are preserved. The exact locations of the poles and zeros are selected based upon the characteristics of the controller 10, such as $\omega_2$ and the gain $k_1$. Of note, the gain of the system 12 is controlled by the gain $k_c$ of the compensating unit 26 and the gain $k_1$ of the high gain filter $J_1(s)$ 20, both of which may be independently adjusted to tune the system 12.

While a phase lead/lag compensator has been shown to illustratively comprise the compensating unit 26, $G_{c1}(s)$, a phase lead compensator, or any phase compensating technique that introduces a phase lead or the like may be employed to correct the phase lag introduced by a reduction in $\omega_2$. A lag compensation introduced by the compensating unit 26 may also be used to increase the low-frequency gain for improved disturbance rejection or to decrease the high-frequency gain for improved noise rejection or augmented gain margin that may also have been caused by the decrease in $\omega_2$.

Additionally, and still referring to FIG. 1C, the lead/lag compensator can be used in addition to an unstable phase network $G_{c2}(s)$ 28, illustratively comprised of at least an unstable pole and a stable zero, which can be adjusted, as will be seen below, to improve response in the time domain thereby improving the overall performance of the resultant controlled system.

It can also be shown that the design method can be applied to the open loop unstable poles, that is the poles of the plant P(s), or those of the compensator C(s), or of both, can be unstable. The above can be incorporated directly into $J_2(s)$ which can then be described using the following generalized forms:

$$J_2 = \prod_{i=1}^{k-m} \frac{k_i\omega_{2i}}{(s+\omega_{2i})} \prod_{j=1}^{m} \frac{k_j(s+\omega_{4j})}{(s-\omega_{3j})} \quad [15]$$

$$J_2 = \prod_{i=1}^{k-m} \frac{k_i\omega_{2i}}{(s+\omega_{2i})} \prod_{j=1}^{m+l} \prod_{r=0}^{l} \frac{k_{jr}(s+\omega_{3r})}{(s-\omega_{3j})} \quad [16]$$

Therefore, stability and sensitivity goals can be achieved using an open loop that includes unstable poles. These poles can exist in the plant P(s), in the compensator C(s) or in both. The following shows the principles of a graph method ensuring the encirclement of the critical point when a stable zero z and an unstable pole p is added, e.g. for $z \leq p \leq \omega_1$. If J(s) is chosen such that:

$$J(s) = \frac{k_1}{(s+\omega_1)}\left[\frac{\omega_2}{(s+\omega_2)}\right]^k\left[\frac{(s+z)}{(s-p)}\right]$$

the condition:

$$|J(\omega_1)| \geq 1 + \frac{1}{\varepsilon}$$

translates into:

$$k_1 \geq \omega_1\left[1+\frac{1}{\varepsilon}\right]\left|\frac{(j\omega_1+z)}{(j\omega_1-p)}\right|2^{-\frac{(k+1)}{2}}$$

while the gain $k_1$ is also increased to satisfy the conditions:

Real$\{J(\omega_f)\} \geq -1+1/M$ and $|Im\{J(\omega_f)\}|=1/M$ for some $\omega_f, \omega_1 \leq \omega_f < \omega_2$ This ensures one encirclement of the critical point (−1,0) as |J(ω)| is a decreasing function of ω for ω>$ω_1$, and guarantees the stability of the closed loop while the open loop is unstable. The added condition:

$$\arg\{J(\omega)\} > -\pi + \arctan(M/(M-1)) \text{ for } \omega > \omega_f$$

could guarantee that the M sensitivity circle is still encircled. Note that the added phase of the unstable pole—stable zero combination in the compensator contributes a phase varying between −180° and 0°.

Note that the condition of non-encirclement of the M sensitivity circle can also be satisfied by choosing $\omega_b$ as in the minimum phase case. Recall that the phase of $J(\omega_b)$ can be made close to −90° as $\omega_b$ can be chosen so that:

$$|P(\omega_b)C(\omega_b)| \le 1 - 1/M \text{ for } \omega \ge \omega_b$$

and $$|k \cdot \arctan(\omega_b/\omega_2) + \arctan(\omega_b/\omega_1)| < \pi/2$$

and ensuring that the contributed phase of (s+z)/(s−p) satisfies:

$$\arg\{(j\omega_b + z)/(j\omega_b - p)\} > -\pi + \arcsin(1/M).$$

As a general rule, addition of unstable poles and stable zeros in the compensator do not constitute a problem as long as the Nyquist criteria is satisfied. Higher gains can make sure that the ϵ and the M sensitivity circles are encircled and the design of $J_2(s)$ becomes the principal tool that allows the Nyquist curve to complete its trajectory on the right to the M sensitivity circle.

Of note, the compensating unit 26 may be implemented in both analog and digital control forms, for instance in the Laplace and Z-transform domains, for application on a digital signal processors or the like. Indeed, referring back to FIG. 1B, in accordance with an illustrative embodiment of the present invention, the transfer function of a high gain filter $J_1(s)$ 20, and the transfer function of the low pass filter $J_2(s)$ 22 may be represented in the Z-domain for digital implementation using standard digital control techniques as are generally known in the art. In particular, given that $J_1(s)J_2(s) = J(s)$, $J(s)$ may be decomposed into a sum using the residue theorem, or as is generally known as Cauchy's Residue Theorem, assuming that:

$$J(s) = \left[\frac{k_1}{(s+\omega_1)}\right]\prod_{i=1}^{k}\frac{\omega_{2i}}{s+\omega_{2i}} = \frac{K}{s+\omega_1} + \sum_{i=1}^{k}\frac{K_i}{(s+\omega_{2i})} \quad [17]$$

with $K = [(s+\omega_1)J(s)]_{s=-\omega_1}$ and $$K_i = \prod_{j=1}^{k}\left[\frac{\omega_{2j}}{(s+\omega_{2j})(s+\omega_1)}\right]_{s=-\omega_{2i}}$$

j≠i which translates into the following inverse Laplace transform:

$$j(t) = Ke^{-\omega_1 t} + \sum_{i=1}^{k} K_i e^{-\omega_{2i} t} \quad [18]$$

and the z-transform given by:

$$J(z) = \sum_{i=1}^{k}\frac{K_i z}{(z - e^{-\omega_{2i}T})} + K\frac{z}{z - e^{-\omega_1 T}} \quad [19]$$

Now, assuming that $J_1(s) = (K/(s+\omega_1))$ and $J_2(s) = [\omega_2/(s+\omega_2)]^k$, then:

$$J(s) = J_1(s)J_2(s) = \frac{K}{s+\omega_1} + \sum_{i=1}^{k}\left[\left(\frac{K_i}{(s+\omega_2)}\right)^i\right] \quad [20]$$

By letting i=k−l, then:

$$K_{k-l} = \left[\frac{1}{l!}\right]\frac{d^l}{ds^l}[(s+\omega_2)^k J(s)]_{s=-\omega_2} \quad [21]$$

and:

$$K = [(s+\omega_1)J(s)]_{s=-\omega_2} \quad [22]$$

and thus J(s) translates into the inverse Laplace transform:

$$j(t) = Ke^{-\omega_1 t} + \sum_{l=1}^{k}\left[\frac{K_{k-l}}{(l-1)!}\right]t^{l-1}e^{-\omega_2 t} \quad [23]$$

or, by taking into account that the z-transform of $e^{-an}n^k$ is $$Li_{-k}\left(\frac{e^{-a}}{z}\right)$$

where the Logarithmic integral function Li is defined within the region of convergence by $$Li_{-k}(r) = \sum_{n=1}^{\infty} n^k r^k,$$

then the z-transform of J(s) becomes:

$$J(z) = \frac{Kz}{(z - e^{-\omega_1 T})} + \sum_{l=1}^{k}\left[\left(\frac{K_{k-l}}{(l-1)!}\right)\right]Li_{-l+1}\left(\frac{e^{-\omega_2 T}}{z}\right) \quad [24]$$

Now, assuming that $J_2(s)$ has p repeated values $\omega_{2i}$, (i=1 ... p) of order $r_i$ and $q_j$ (j=1, 2, ... q) distinct values, such that $\Sigma r_i + q = k$, $$J_2(s) = \left[\sum_{j=1}^{q}(j=1)\left[\frac{\omega_{2j}}{(s+\omega_{2j})}\right]\right]\left[\sum_{i=1}^{p}(i=1)\left[\frac{\omega_{2i}}{(s+\omega_{2i})}\right]^{r_i}\right]$$

and $$J_1(s) = \frac{K}{(s+\omega_1)}$$

and $J(s) = J_1(s)J_2(s)$ then:

$$J(s) = \frac{K}{(s+\omega_1)} + \sum_{j=1}^{q}\left(\frac{K_j}{(s+\omega_{2j})}\right) + \sum_{i=1}^{p}\sum_{l=1}^{ri}\frac{K_{i(ri-l)}}{(s+\omega_{2i})^{ri-l}} \quad [25]$$

Given $K = [(s+\omega_1)J(s)]_{s=-\omega_1}$, $$K_j = \sum_{j=1}^{q}[(s+\omega_{2j})J(s)]_{s=-\omega_j} \text{ and}$$

$$K_{i(ri-l)} = \left[\frac{1}{l!}\right]\frac{d^l}{ds^l}[(s+\omega_{2i})^{ri}J(s)]_{s=-\omega_{2i}},$$

the inverse Laplace transform of $J(s)$ is given by:

$$j(t) = Ke^{-\omega_1 t} + \sum_{j=1}^{q}e^{-\omega_{2j}t} + \sum_{i=1}^{p}\sum_{l=1}^{ri}\left[\frac{K_{i(ri-l)}}{(l-1)!}\right]t^{l-1}e^{-\omega_{2i}t} \quad [26]$$

and the z-transform of $J(s)$ is thus given by:

$$J(z) = \frac{Kz}{(z-e^{-\omega_1 T})} + \sum_{j=1}^{q}\left(\frac{K_j z}{(z-e^{-\omega_{2j}T})}\right) + \quad [27]$$

$$\sum_{i=1}^{p}\sum_{l=1}^{ri}\left[\frac{K_{i(ri-l)}}{(l-1)!}\right]Li_{-l+1}\left(\frac{e^{-\omega_{2i}T}}{z}\right)$$

The repeated poles contribute to a series expansion of the transfer function with positive or negative coefficients. Each of these elements of the series expansion contributes separately to the overall time response and the choice of repeated poles may improve the fine tuning of the overall time response. Additionally, it is possible to extend the region of convergence of the logarithmic integral function in the whole complex plane by analytic continuation in the case of poles located outside the region of convergence $|z|<1$.

Figure 1D:
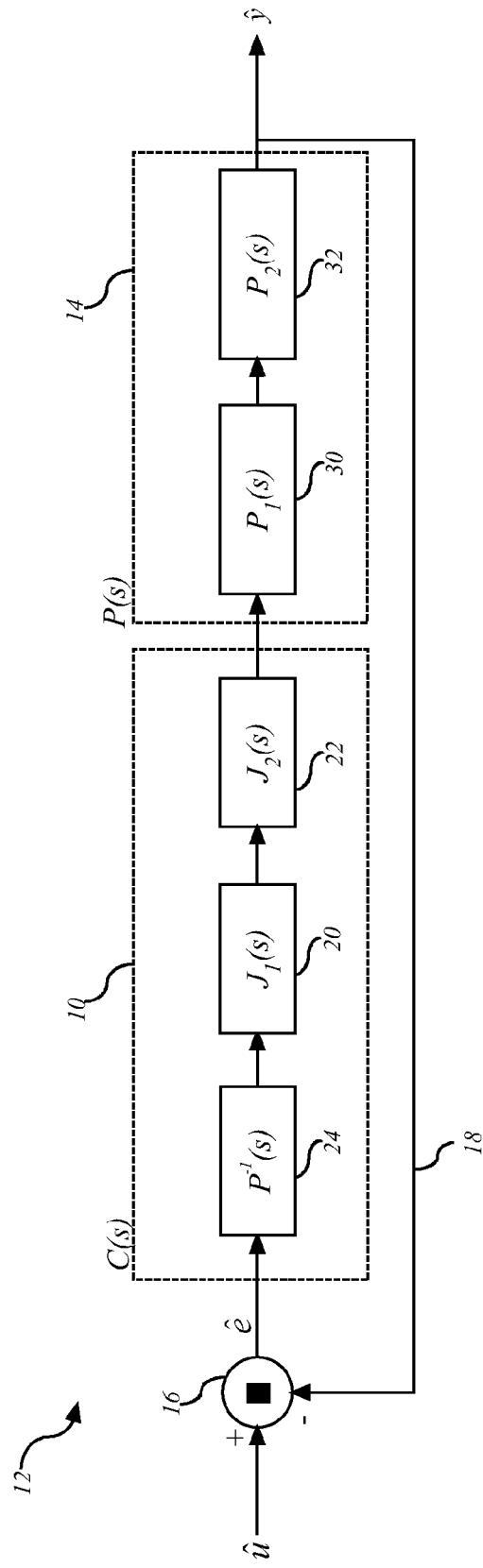

Now referring to FIG. 1D, the controller 10 may equally be employed as part of feedback system 12 to stabilize an unstable plant 14. The application of the controller 10 may thus be further extended according to the following design considerations. In the case that the plant 14 is an unstable process, the unstable plant 14 may be reduced to its minimum phase part 30, $P_1(s)$, and its unstable part 32, $P_2(s)$, such that the cascaded elements represent the plant 14 in the following manner:

$$P(s)=P_1(s)P_2(s) \quad [28]$$

The behavior of the unstable part $P_2(s)$ 32 is denoted by:

$$\frac{c}{(s+s_0)^q} \quad [29]$$

such that when $s \to \infty$ for a given value of $s_0$ and constant c, $P_2(s)$ approaches a function based on the form:

$$\frac{c}{s^q} \quad [30]$$

Note that the value of c in [29] and [30] is not necessarily the same, it is simply some constant. A further transfer function $H(s)$ can be defined such that:

$$H(s) = \left[\frac{c}{(s+s_0)^q}\right]P_2^{-1}(s)P(s) = \frac{c}{(s+s_0)^q}P_1(s) \quad [31]$$

such that $H(s)$ has the same behavior as $P(s)$ at high frequency. By selecting the frequency $\omega_a$ such that $P(s)$ is holomorphic for $|s|>\omega_a$ and the frequency $\omega_c$ above which $P(s)$ and $H(s)$ have the same high frequency behavior, i.e. $\|P(s) ((H(s))^{-1}\|<\alpha<1$, $|s|>\omega_c$ where $\alpha$ is a value inferior to unity and sufficiently small to ensure that $M(1-\alpha)>1$, the design of the controller 10 is carried out with the objective of satisfying the following conditions $$\sup_{|\omega|<\omega_1}|J(\omega)| > \left|[inf(P(\omega)H^{-1}(\omega))]^{-1}\left[\frac{1+\varepsilon}{\varepsilon}\right]\right|, \text{ wherein } |\omega|\leq\omega_1 \quad [32]$$

$$\sup_\omega|J(\omega)| > \left|[inf(P(\omega)H^{-1}(\omega))]^{-1}\left[\frac{1+M}{M}\right]\right| \text{ for all } \omega. \quad [33]$$

and $$C(s) = H^{-1}(s)J(s)$$

Additionally, over a bandwidth defined by $\omega_x \geq \max(\omega_1, \omega_a, \omega_c)$, the design of the controller 10 is done according to the relation given by inequality [5] by ensuring that the expression given by:

$$\left|[inf(P(s)H^{-1}(s))]\cdot\left[k_1\left(\frac{\omega_1}{s+(1+k_1)\omega_1}\right)\right]\right|\cdot \quad [34]$$

$$\left|1-\left[\frac{\omega_2}{s+\omega_2}\right]^k\right| \leq \left[1-\alpha-\frac{1}{M}\right]$$

is satisfied. Note that the condition in equation [33] may also be satisfied by increasing the value of $\omega_2$ as needed. i.e. as $k_1$ is increased, the expression $k_1[\omega_1/(s+(1+k_1)\omega_1)]$ approaches unity, while the expression $[1-[\omega_2/(s+\omega_2)]^k]$, approaches zero as $\omega_2$ increases. This gain-pole dependency is consistent with the quasi-linear property of the feedback compensation. Note that the equation at [34] has been derived from BEN-SOUSSAN, David, ZAMES, Georges, "*Multivariable Feedback, Sensitivity and Decentralized Control*", IEEE Transactions on Automatic Control, vol. AC-28, n° 11, November 1983, which is incorporated herein by reference in its entirety.

Still referring to FIG. 1D, as discussed above, the controller 10 is constructed according to the form $C(s)=P^{-1}(s)J_1(s)J_2(s)$ in the case that $P(s)$ is minimum phase where $J_1(s)$ is a high gain filter 20 having a fast time response and $J_2(s)$ is a low pass filter 22 acting at high frequencies such that the controller 10 is strictly proper and $[P(\omega)H^{-1}(\omega)]$ is holomorphic. For a minimum phase system which has no poles and no zeros in the complex right half plane and satisfies the attenuation property based on the inequality:

$$|P(s)| > \frac{c}{s^q} \quad [35]$$

for high bandwidth $\omega>\omega_e$, the sensitivity objectives can be reached by designing $J_1(s)$ and $J_2(s)$ such that [32] and [33] above are satisfied.

In a particular embodiment, $J_1(s)$ can have the form:

$$k_1\left[\frac{\omega_1}{s+\omega_1}\right] \qquad [36]$$

and $J_2(s)$ the form:

$$\left[\frac{\omega_2}{s+\omega_2}\right]^k \qquad [37]$$

wherein the frequency $\omega_1$ is chosen in a manner to obtain a fast time response $e^{-\omega_1 t}$. Note that $\omega_1$ could be replaced by $\omega_{10}$, $\omega_{10} \geq \omega_1$ which is chosen to satisfy improved time domain performance objectives as long as the gain of the compensator at low frequency $k_1$ is practically realizable and is chosen to be sufficiently high to ensure the condition [32] is satisfied.

Furthermore, the gain $k_1$ along with the frequency $\omega_2$ (satisfying $\omega_2 > \omega_e$) and the exponent k are adjusted to satisfy the condition [33]. The design of the controller 10 also takes into account an intermediary frequency $\omega_b$ for which $$\mathrm{Re}[P(\omega)C(\omega)] > -\left(1-\frac{1}{M}\right)$$

all while ensuring that condition [33] is satisfied and for which the modulus of $P(\omega)C(\omega)$ is a decreasing function over the frequency range $\omega > \omega_b$. Consequentially, the time response is essentially determined by the real and negative pole $\omega_1$ which is chosen to satisfy the time domain performance objectives. Note, although $J(\omega)$ has been chosen to be a positive function in the frequency domain $\omega < \omega_1$ it could be ultimately, i.e. at a high enough frequency, located to the right of the real line $(-1+1/M)$ in the complex plane or even simply lie outside the sensitivity circle M.

The above results can be extrapolated to a multi-input multi-output system, in which time response performance could be targeted in the context of a decentralized control feedback system.

Still referring to FIG. 1D, in the case that an unstable plant P(s) 14 satisfies the inequality $$|P(s)| > \frac{c}{s^q}$$

for high frequencies $\omega > \omega_e$, the plant 14 as discussed above is reduced to its minimum phase part P(s) 30 and its unstable part $P_2(s)$ 32 in that $P(s)=P_1(s)P_2(s)$. Furthermore, as discussed above we define H(s) as $$H(s) = \frac{c}{(s+s_0)^q} P_1$$

(s) such that as $s \to \infty$ for a certain value of $s_0$ and a certain c, H(s) has the same behavior as $P_2(s)$ at high frequency $\omega > \omega_e$.

Now, defining $\omega_d$ as the desired bandwidth for a fast time response, $\omega_1$ is preferably chosen to be superior or equal to $\omega_d$; defining $\omega_a$ for $|\omega| \geq \omega_a$ as the bandwidth for which P(s) 14 is holomorphic and $\omega_c$ is the bandwidth above which P(s) 14 and H(s) have the same high frequency behavior, i.e.

$|P(s)H^{-1}(s)-1| > \alpha$, $|\omega| \geq \omega_b$, $|\omega| > \omega_c$ where $\alpha$ is the value inferior to unity and is sufficiently small to ensure that $M(1-\alpha) > 1$.

The controller design follows the same procedure as that undertaken for a minimum phase plant as described hereinabove, according to the transfer function:

$$C(s) = H^{-1}(s)J(s) = \left(\frac{1}{c}\right)(s+s_0)^q P^{-1}(s)J(s) \qquad [38]$$

where $J(s)=J_1(s)J_2(s)$ and where $J_1(s)$ is a high gain filter 20 having an ultra fast time response and $J_2(s)$ is a low pass filter 22 acting at a very high frequency such that the controller 10 is strictly proper.

Again referring to FIG. 1D, a discussed above, a possible implementation of J(s) is $J(s)=J_1(s)J_2(s)$ where $J_1(s)$ 20 illustratively has the form $$J_1(s) = k_1\left[\frac{\omega_1}{(s+\omega_1)}\right]$$

and $J_2(s)$ 22 has the form $$J_2(s) = \left[\frac{\omega_2}{(s+\omega_2)}\right]^k$$

which satisfies $\omega_2 > \omega_e$. In accordance with an alternative embodiment of the present invention, the low pass filter $J_2(s)$ 22 could have a more general form as illustratively described in equation [6] hereinabove. The design of the controller 10 is done by taking into consideration the inversibility at high frequencies of the function:

$$P(\omega)H^{-1}(\omega)=(s+s_0)^q P_1^{-1}(s) \qquad [39]$$

such that $|J(\omega)|$, which is essentially controlled by $J_1(\omega)$ and the Nyquist diagram, remains to the right of the real value $-1+1/M$ all while satisfying [33]. The gain $k_1$, the frequency $\omega_2$, and the parameter k are adjusted to satisfy conditions [33] and [34]. For example:

$$k_1 = 2 \cdot \max\begin{bmatrix} \inf[P(\omega)H^{-1}(\omega)] \cdot \left(1+\frac{1}{\varepsilon}\right) \text{ for } \omega < \omega_1, \\ \inf[P(\omega)H^{-1}(\omega)] \cdot \left(1+\frac{1}{M}\right) \text{ for all } \omega \end{bmatrix} \qquad [40]$$

Illustratively, the frequency $\omega_2$ and the parameter k are adjusted so that $|J(\omega)| > 1/2$ for $\omega \leq \omega_1$ while making sure that k is large enough to ensure that C(s) is strictly causal. Note, that $|J_1(\omega_1)| > k_1/2^{1/2}$ for $\omega \leq \omega_1$ and that $|J_2(\omega_1)|$ can be made bigger than $(1/2)^{1/2}$ for $\omega_2$ large enough so that $|J(\omega_1)| > k_1/2$ and so that [34] is satisfied. Of note, the choice of $\omega_2$ may be reduced in the manner as has been described hereinabove.

Figure 1E:
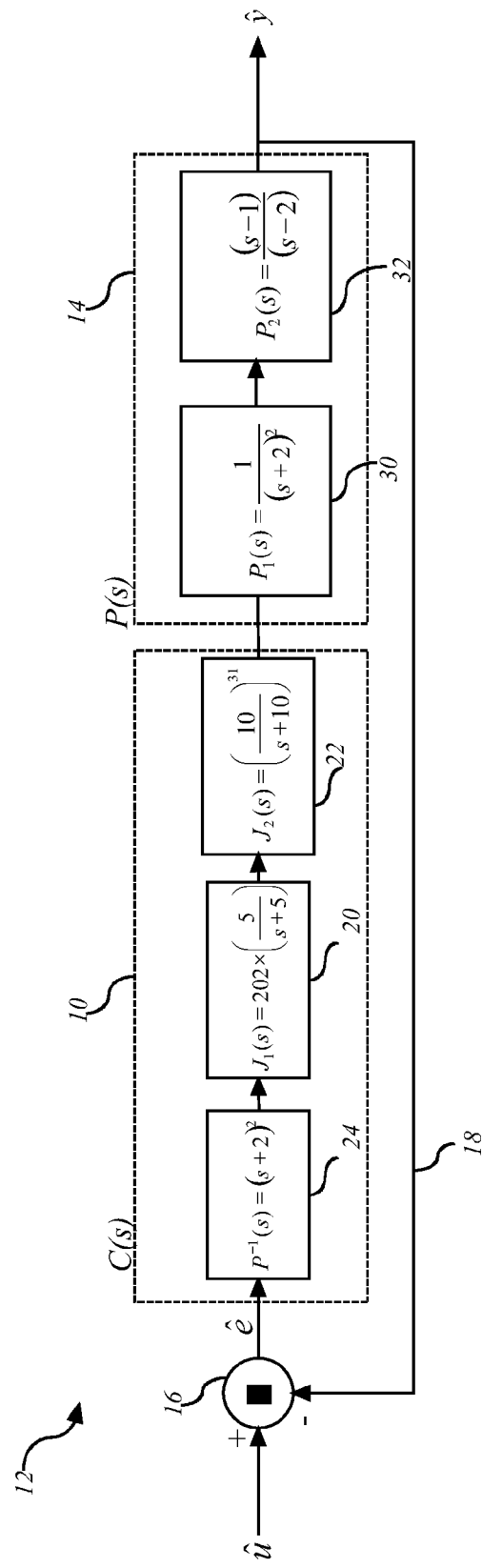

Now referring to FIG. 1E, the effect of this controller design will be exemplified using an example. Since the controller 10 may be represented as a rational transfer function, it can therefore be easily implemented in the feedback controlled structure as illustrated in FIG. 1A, in an offline manner. Moreover, since the controller 10 is linear and Nyquist stable for all large gains $k_1$, the value of $k_1$ may be increased, even on-line, thus improving the performance of the feedback system 12 during functioning if the variations of $k_1$ lie within a sector and an appropriate criteria such as the circle criteria is satisfied. In accordance with the following exemplary embodiment, the plant 14 to be controlled is unstable and the controller 10 designed according to the approach described hereinabove. Illustratively, the plant 14 is represented by the following transfer function:

$$P(s) = \frac{(s+1)}{(s-2)(s+2)^2} \quad [41]$$

As part of the controller design, it is desired to have a system time response faster than $e^{-4t}$ i.e. $\omega_d=4$ and a sensitivity smaller than 0.01 in the bandwidth $|\omega|<5$ and smaller than 3 on the whole frequency range, i.e. $\epsilon=0.01$ and $M=3$. Accordingly, $\omega_1=5$ is selected.

Still referring to FIG. 1E, the plant P(s) 14 can be reduced to two transfer functions of the form:

$$P_1(s) = \frac{1}{(s+2)^2} \quad [42]$$

and:

$$P_2(s) = \frac{(s+1)}{(s-2)} \quad [43]$$

The plant 14 in accordance with this exemplary embodiment presents a significant obstruction to high performance by a linear feedback. Its excess of poles over zeros limits the increase of the controller gain if the dynamic compensation order is kept at acceptable low levels, affecting performance and stability which call for increased gain. Quasi-linear compensation can be applied to achieve high performance simultaneously in the time and frequency domains. Note that $|P(s)| > c_1/s^2$ for values of s that are superior to 1 and that at high frequencies, H(s) converges towards $c/(s+s_0)^q$, or 1, in this case. Furthermore, consider that $$H(s) = \frac{1}{(s+2)^2}$$

and that at high frequencies, $\alpha=0$. In other words, $\omega_a=1$ and in this particular case, $\omega_c$ can take any value e.g. 1.

Of note, a compensating unit 26 as has been described hereinabove may be employed to correct phase shifts introduced by a controller 10 used to control unstable plants P(s) 14 comprising a reduction in $\omega_2$.

Still referring to FIG. 1E, a controller 10 of the form:

$$C(s) = (s+2)^2 k_1 \left[\frac{\omega_1}{(s+\omega_1)}\right]\left[\frac{\omega_2}{(s+\omega_2)}\right]^k \quad [44]$$

is applied such that the condition k>1 ensures that the controller 10 is strictly proper. The parameters $k_1, \omega_2, k$ can be chosen to ensure that for $|\omega| \leq \omega_1$, $|J(\omega)|>1/2$, e.g. $|J_2(\omega)|>(1/2)^{1/2}$, and $|J_1(\omega)|>(1/2)^{1/2}$. For example, if $\omega_1=\omega_d=5$ and $\omega_2=10$ the requirement will be to chose k such that $(100/125r>(1/2)^{1/2}$, for instance, assigning k=2 would satisfy the inequality and ensure that C(s) is strictly causal. Alternatively, choosing k=2 would lead to a value of $\omega_2>\omega_1 (2^{1/k}-1)^{-1/2}$, i.e. $\omega_2>5(2^{1/2}-1)^{-1/2}=7.76$. Moreover, $P(\omega)H^{-1}(\omega)=(s+1)/(s-2)$ and $|\inf(P(\omega)H^{-1}(\omega))|=1$ for all values of $\omega$.

It can be determined that for the sensitivity objectives defined by $\epsilon=0.01$ and $M=3$, $k_1=2 \max[(1+1/0.01), (1+1/3)]$, that is $k_1=202$. In the case that P(s) contains poles at the origin, these can be integrated in the design of $J_1(s)$ so that the best possible sensitivity and time response performances are met.

If P(s) incorporates at least one right half plane zeros, they could be included in the unstable part $P_2(s)$ as long as precautions are taken to ensure that C(s) is strictly proper and that $|\inf(P(\omega)H^{-1}(\omega))|$ is still bounded below. For example, if the numerator (s+1) is replaced by (s−5) in equation 43, it would still follow that $|\inf(P(\omega)H^{-1}(\omega))|=1$ for all values of $\omega$ and the sensitivity bound over all frequencies would still be M. However, the sensitivity will reach unity at $\omega=5$. If the right half plane zeros have values (much) bigger than $\omega_1$, the lower bound on sensitivity $\epsilon<1$ can be achieved over the limited frequency range $\omega \leq \omega_1$. Otherwise, only a sensitivity bound smaller than M on all frequencies can be achieved. Additionally, care should be taken to ensure accordance with the Nyquist criteria.

In a similar fashion, right half plane zeros could also be added to the compensator, provided that the Nyquist criteria of the number of encirclements around the critical points respected and with appropriate gain and phase margins to ensure robust stability, and provided the Nyquist diagram of the open loop of the feedback unity system stays outside the appropriate sensitivity circles and that their insertion improves indeed the time response.

More complex means can be used to fine tune the time response. Indeed, in certain cases, the design could be improved by incorporating all pass networks. For example, letting A(s) be an all pass network so that a right half plane zero (s−z) could be replaced by (s+z)A(s) where A(s)=(s−z)/(s+z). The left half plane zero could be incorporated into the invertible part of the plant so that the effect of A(s) is to contribute a constant amplitude and a rotation in the negative direction of the Nyquist curve. Similarly, an unstable pole 1/(s−p) could be represented by B(s)/(s+p) where B(s) is an all-pass network that will rotate the Nyquist curve in a positive direction. Special care should than be given to stability and sensitivity considerations as well as to time response considerations.

For open loops including right half plane zeros $z_i$ or poles $p_j$ in the plant or the compensator or both, J(s) comprising the product of a high gain filter $J_1(s)$ having a gain sufficient that $$|J(\omega)| > \left[1 + \frac{1}{\epsilon}\right]$$

when $|\omega| 23 \omega_1$ smaller than $z_i$ and $|1+J(\omega)|>1/M$ for all $\omega$ provided the condition of encirclements of the Nyquist criterium is respected, wherein $\omega_1$ is selected to obtain a desired time response, and a low pass filter $J_2(s)$ selected such that $|1+J(\omega)|>1/M$ for all $\omega$ and C(s) is strictly proper, wherein $\epsilon<1$ and M>1 and $\epsilon$ and M are selected to meet a desired sensitivity requirement.

Figure 2A:
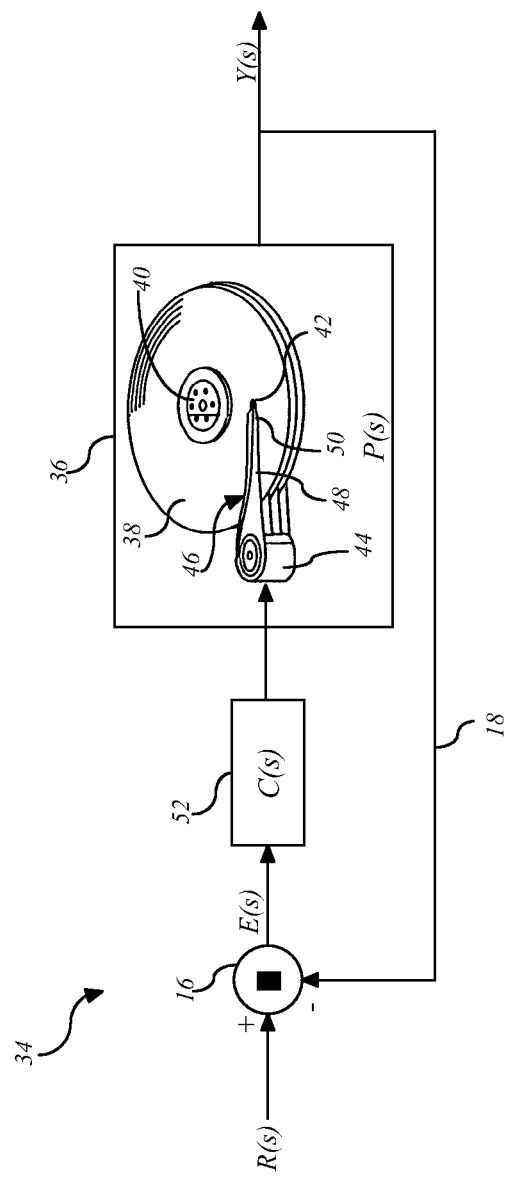
FIGS. 2A and 2B provide block diagrams of a hard disk drive servo control system.

Referring now to FIG. 2A, a hard disk drive servo system generally referred to using the reference numeral 30 will now be described. The hard disk drive servo system 34 for a hard disk drive 36 comprises a magnetic recording platter 38 for storing data on the surface thereof in sectors and tracks wherein the tracks are concentric circles and the sectors are pie-shaped wedges on a track, and a drive motor 40 for spinning the platter 38. Additionally, a magnetic head 42 for writing and reading information to and from the platter 38 is provided and an arm rotary actuator 44 comprising a permanent magnet DC motor and an amplifier (not shown) which is used to position an arm 46 comprising a suspension arm 48 for long range seeking. In a particular embodiment, a slider device 50 connected to the suspension arm 48 and comprising a flexure or metal spring can be provided to enable the head 42 connected thereto to float above the platter 38 surface for micro-tracking. The hard disk drive servo system 34 further comprises a servo controller 52 for controlling the position of the magnetic head 40 relative to a track located on the surface of the platter 38. The platter 38 employed in the hard disk drive 36 is generally known to rotate at frequencies of 5,400 or 5,900 or 7,200 Rotations-Per-Minute (RPM) while platters 38 used in servers rotate at frequencies of 10,000 or 15,000 RPM.

Still referring to FIG. 2A, positioning of the head 42 in precision alignment with respect to a track on the surface of the platter 38 is generally known to be undertaken in the following described manner. An input reference track and sector position represented by the Laplace transform R(s) as requested by a host computer (not shown) is inputted to the subtractor 16 which outputs a position error E(s). The position error E(s) is calculated by subtracting an actual position reading Y(s), as monitored by the head 38 itself, from the input reference position R(s). The error E(s) between the actual position Y(s) and the reference position R(s) is then fed into the controller 52 which is tasked to generate drive signals for the actuator 44 such that the arm 46, and ultimately the head 42, is moved to the desired reference position R(s). In particular, the servo controller 52 will control the acceleration of the head 42 due to a torque generated by the actuator 44 on the arm 46. Once the head 42 has been positioned at the reference position R(s), the controller 52 will also ensure that the position of the head 42 remains over the center of the requested track.

Still referring to FIG. 2A, it is generally known that a control objective of the servo controller 52 is to accurately and precisely position the head 42 from one track to another during track seek in the shortest time possible. Since the time for positioning the head 42 over the correct track has a significant impact on the performance of the hard disk drive 36, the quicker the head 42 can be moved between tracks during seeking, the faster information can be stored or retrieved. An additional control objective of the servo controller 52 involves regulating the position of the head 42 during track following. In this regards, the sensitivity of the position of the head 42 to external disturbances is also an important design consideration, especially as hard disks 36 are being employed in mobile computing applications such as in laptops or handheld devices where disturbances from shock and vibration tend to effect the position of the head 42. Additional disturbances to the system also include wear, wobble due to the spindle bearings, resonant oscillations generated by the actuator, measurement noise, and the like.

Figure 2B:
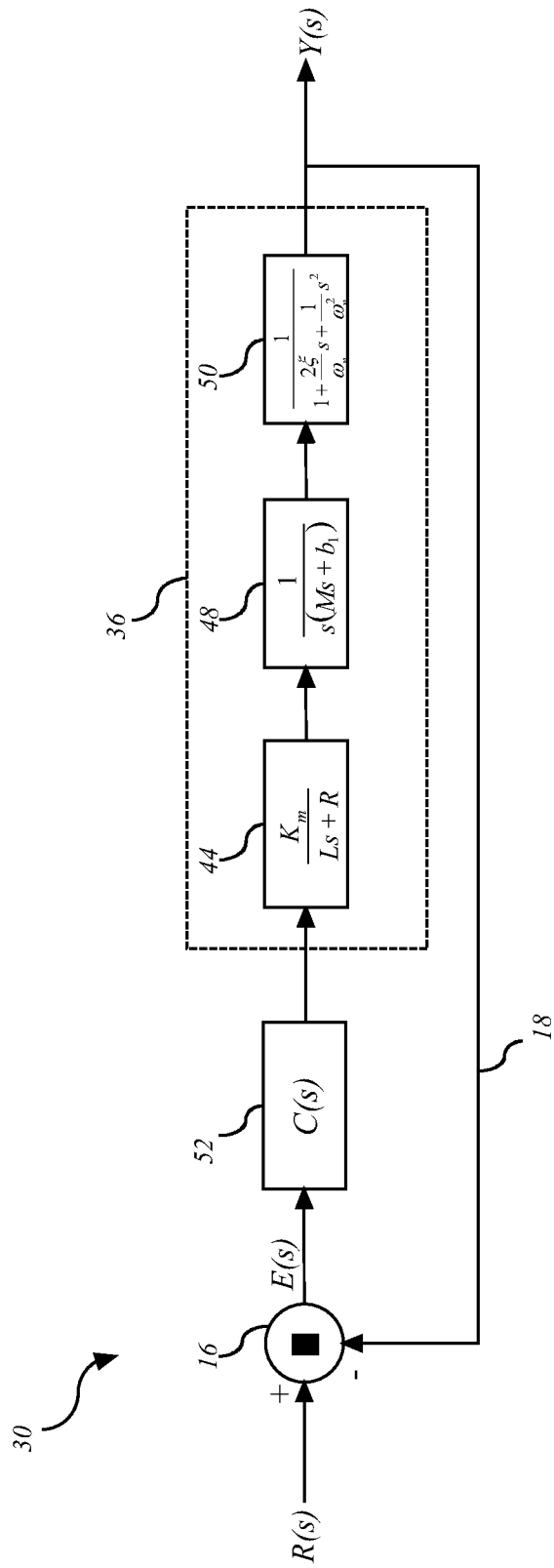

Now referring to FIG. 2B, the transfer function $P_{HD}(s)$ of the actuator 44 and the permanent magnet DC motor, the linear amplifier, the arm 48 and the slider 50 is given in accordance with an exemplary embodiment of the present invention by:

$$P_{HD}(s) = K_m \frac{1}{(Ls+R)} \frac{1}{(s)} \frac{1}{(Ms+b_1)} \frac{1}{\left(\frac{s^2}{\omega_n^2} + \frac{2\xi}{\omega_n}s + 1\right)} \quad [45]$$

wherein M is the inertia of the arm 46 and head 42, $K_m$ is the motor constant, R is the armature resistance, L is the armature inductance, and $b_1$ is the friction. In particular, the model for the actuator 44 is given by:

$$\frac{K_m}{Ls+R} \quad [46]$$

and the model for the suspension arm 48 is given by:

$$\frac{1}{s(Ms+b_1)} \quad [47]$$

Still referring to FIG. 2B, realistic values of the actuator 44 and the suspension arm 48 models are illustratively provided such that M=1 N·m·s²/rad, $K_m$=5 Nm/A, R=1 Ohm, L=1 mH and $b_1$=20 kg/m/s, thus $P_{AS}(s)$ can be rewritten as:

$$P_{AS}(s) = 5000 \frac{1}{(s+1000)} \frac{1}{(s)} \frac{1}{(s+20)} \quad [48]$$

Additionally, the slider 50 is illustratively modeled as a second-order system $P_S(s)$, such as a damped second order mass-spring system, described by the transfer function:

$$P_s(s) = \frac{1}{\left(\frac{s^2}{\omega_n^2} + \frac{2\xi}{\omega_n}s + 1\right)} \quad [49]$$

wherein $\omega_n$ is the under damped angular frequency of the system, and $\xi$ is the damping ratio. Employing realistic values of $\xi$=0.3 and $\omega_n$=18.85×10³ rad/s, the slider 50 transfer function $P_S(s)$ of equation [49] is given by:

$$P_s(s) = \frac{1}{\left(\frac{s^2}{2.8143 \times 10^9} + \frac{s}{3.183 \times 10^5} + 1\right)} \quad [50]$$

Now referring to FIGS. 3A through 6B, in addition to FIG. 2B, the performance of the hard disk drive servo system 34 as described by the above model equations is examined in comparison with a controller 10 of the present invention employed as the servo controller 52 to that of a servo controller 52 employing a variety of other control methods including PID control and velocity feedback control. In particular, the stability margins, sensitivities, the steady-state error and transient responses including rise times and settling times of the system are examined when the gain of the controller 52 is varied from 50 to 1000. The performances are examined by their representations in the time domain by a step response time domain plot and in the frequency domain by a Nichols plot. In examining the time domain performances, particular emphasis is placed on the rise times and the settling times. Rise times and settling times in the context of a hard drive servo system 34 illustratively corresponds to the time the head 42 takes to be positioned from one track to another track and the time that the head 42 ceases to oscillate over a track outside an error band, respectively. In examining the frequency domain performance emphasis is placed on the stability margins and the bandwidth provided by the system.

It is generally known in tracking applications that a good step response requires a phase margin of at least 45 degrees, and often a phase margin of over 70 degrees is favored with a corresponding gain margin of 6 dB. Note, in these other systems a design tradeoff is ordinarily made for improved settling times at the expense of stability.

Figure 3A:
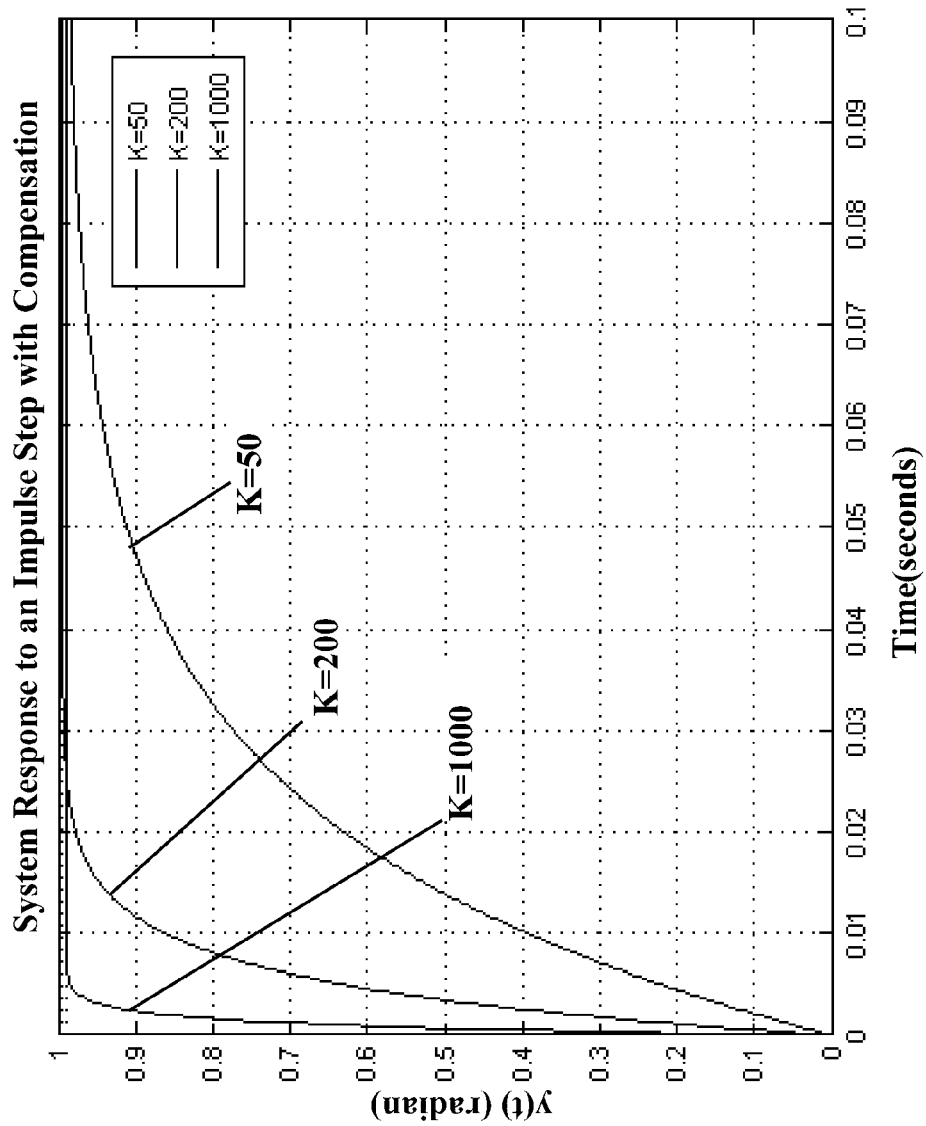
FIG. 3A is a system response plot and FIG. 3B a Nichols plot of the controller of the present invention employed as the servo controller of FIG. 2A.
Figure 3B:
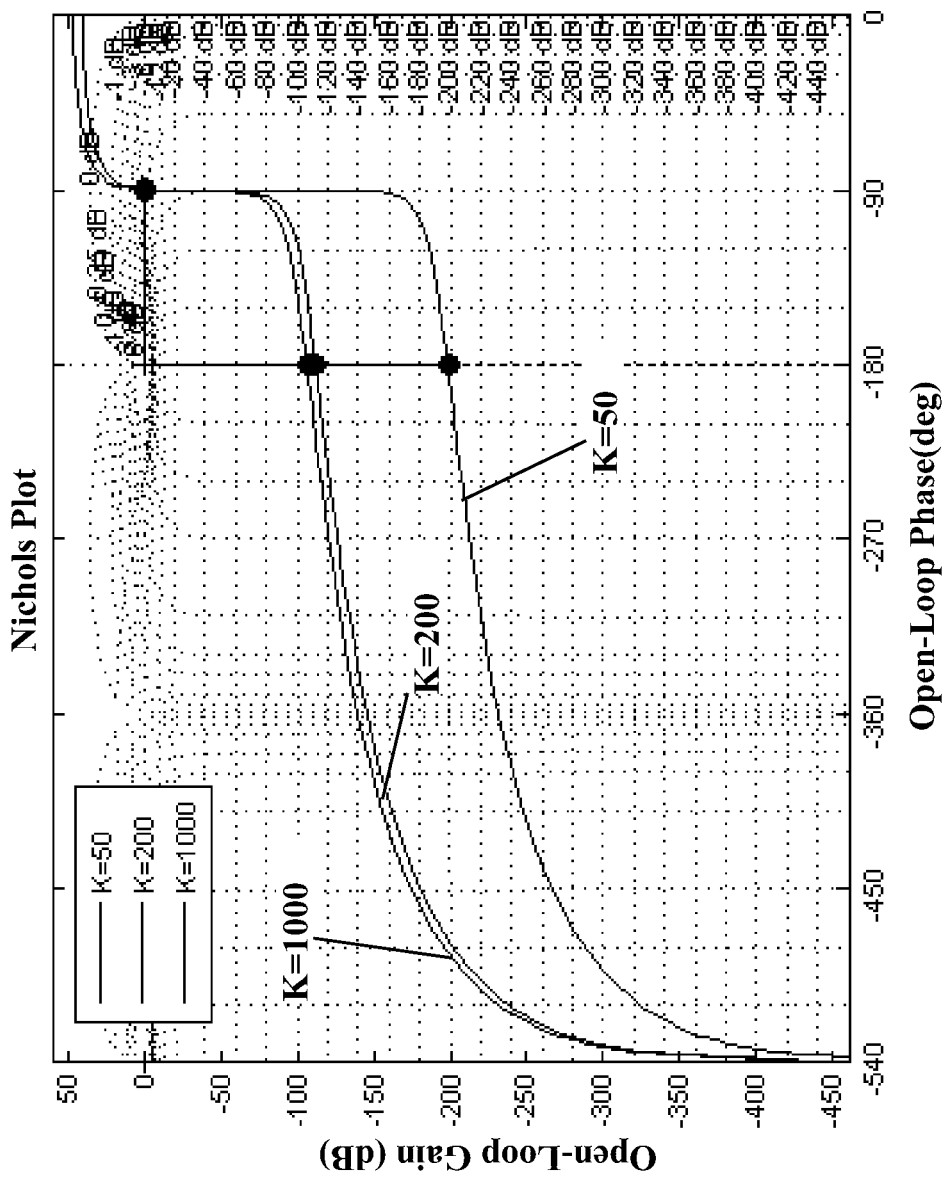

Now referring to FIG. 3A and FIG. 3B in addition to FIG. 2B, the transient response and stability of the hard disk drive servo system 34 when the servo controller 52 is a controller in accordance with an illustrative embodiment of the present invention is exemplified via step response and Nichols plots for a controller of gains K=50, K=200, and K=1000 with time response objectives defined by $\omega_d$=10 and sensitivity objectives $\epsilon$=0.1 and M=1.1. As evidenced from the plots, the controller of the present invention is able to achieve arbitrarily high performances in the time and frequency domains, and in a simultaneous manner. In particular, as is illustrated by the step response plot, an increase in the gain of the controller from K=50 to K=1000 improves rise times from 60 milliseconds to 0.0109 seconds with no overshoot and a rapid settling time. In particular, at a gain of K=200 the system rise time is approximately 0.0109 seconds and is significantly faster than the rise times attainable by other types of controllers. The frequency domain performance of the system demonstrates stability margins with a gain margins varying from 200 dB to 106 dB as the gain is increased, and higher than the gain margins provided for by the other types controllers. The phase margin is negligibly affected and remains at 90 degrees between the gain increase, a direct consequence of the control employed. In this regard it is noted that the rise time is the time necessary for the signal to rise from 10% to 90% of its final value and the stabilizing time is the time necessary for the signal to reach 95% of its final value. Furthermore, the time response can be improved by choosing a larger value of $\omega_d$ ($\omega$ desired), which can also affect the invested energy in the system (that is, the area between the square of the frequency response and the $\omega$ axis).

Figure 4A:
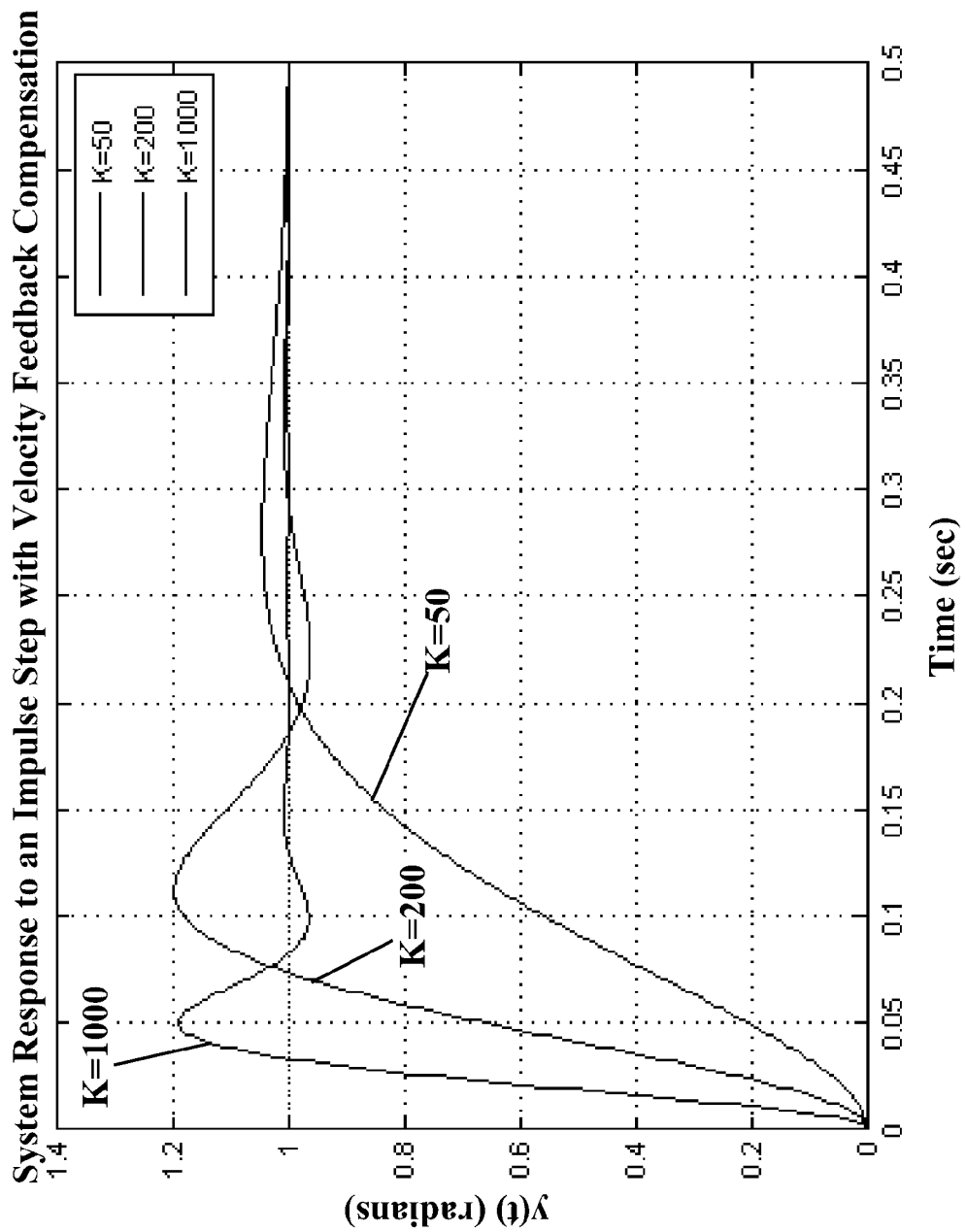
FIG. 4A is a system response plot and FIG. 4B a Nichols plot of a comparative velocity feedback controller employed as the servo controller of FIG. 2A.
Figure 4B:
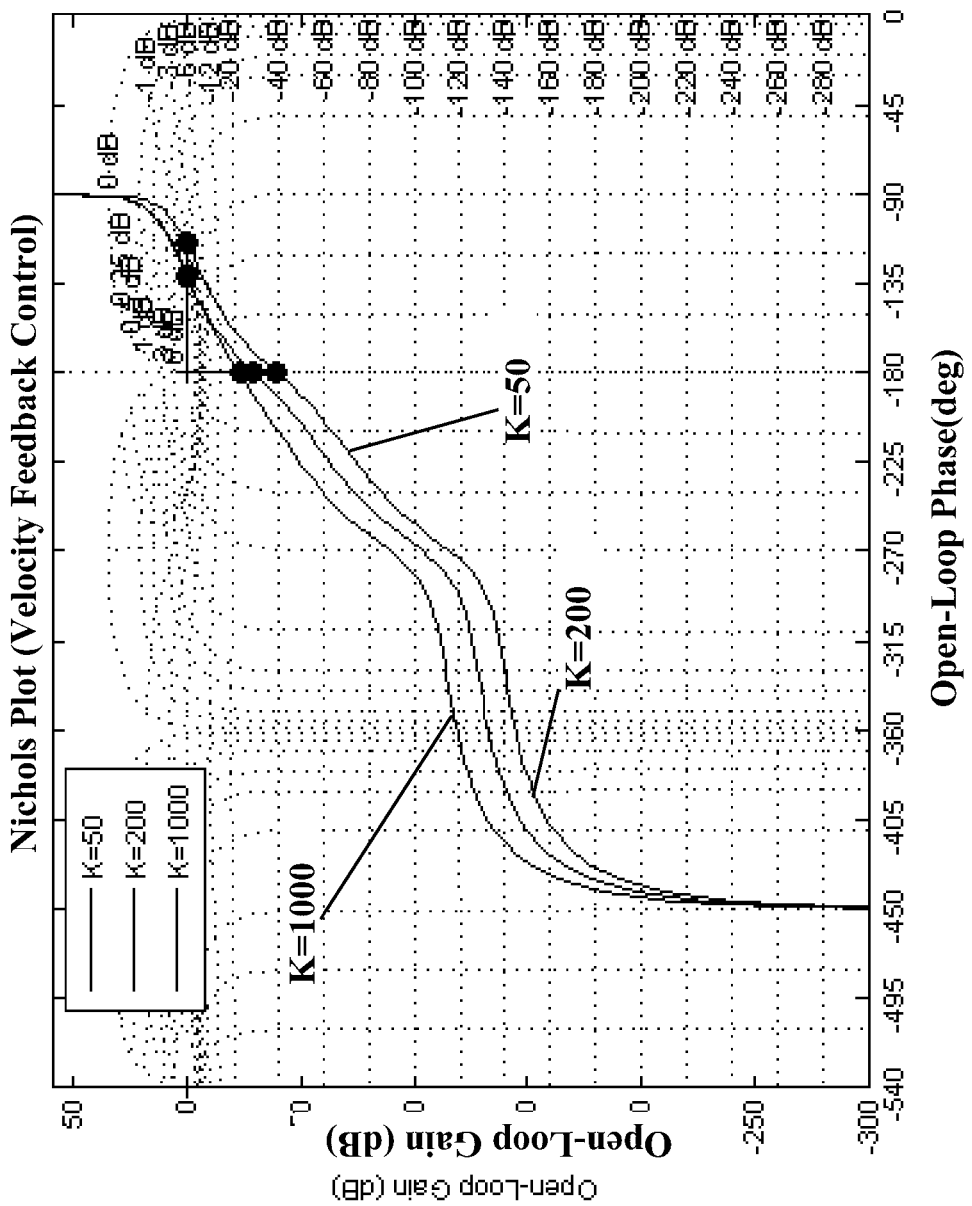

Now referring to FIG. 4A and FIG. 4B in addition to FIG. 2B, the transient response and stability of the hard disk drive servo system 34 when the servo controller 52 is a velocity feedback control is illustrated via step response and Nichols plots. The transient response of the system demonstrates high overshoot and oscillatory behavior as the gain is increased from K=50 to K=1000. In particular, at a gain of K=200 the rise time is approximately 0.0493 seconds. The frequency domain performance of the system demonstrates a gain margin of 29.4 dB as the gain is increased, while the phase margin is minimally affected and remains at 48.4 degrees.

Figure 5A:
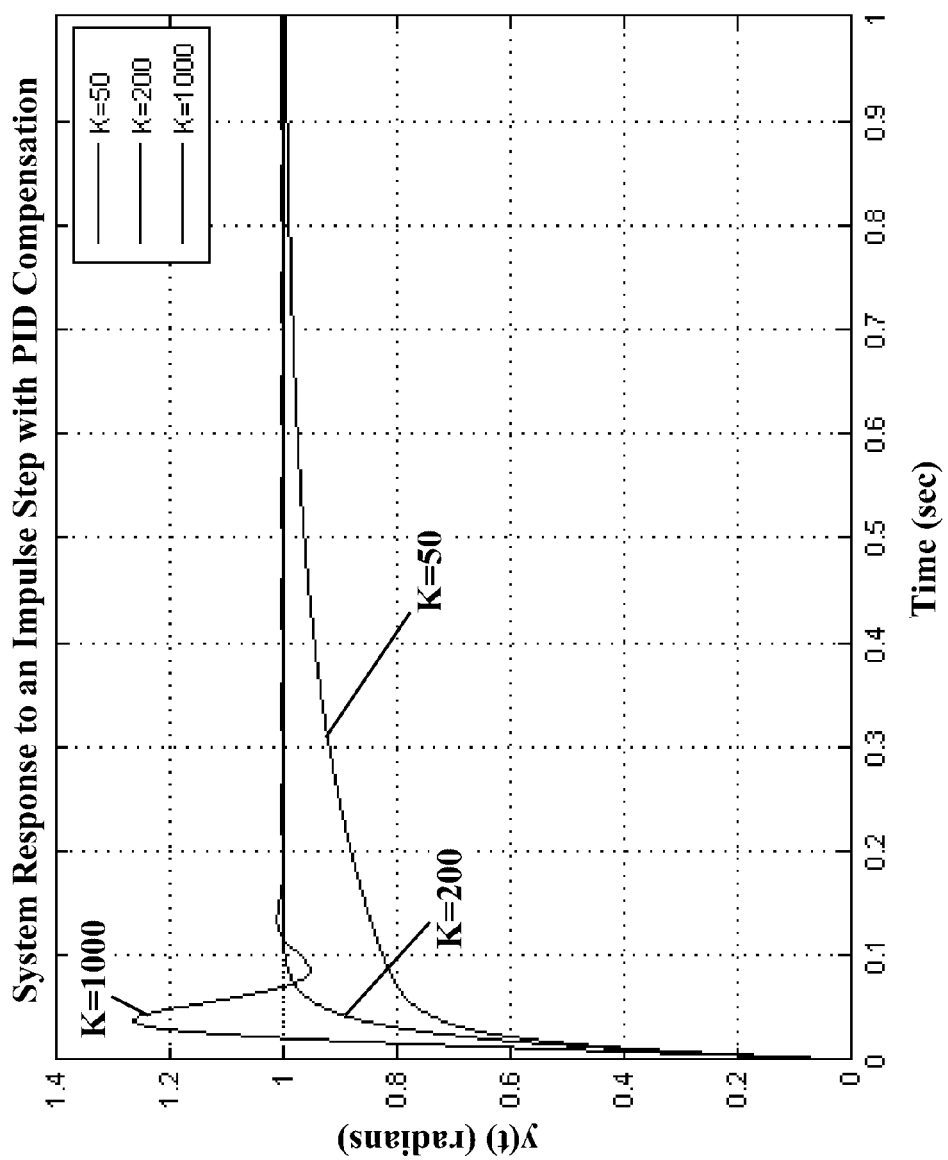
FIG. 5A is a system response plot and FIG. 5B a Nichols plot of a comparative PID controller employed as the servo controller of FIG. 2A.
Figure 5B:
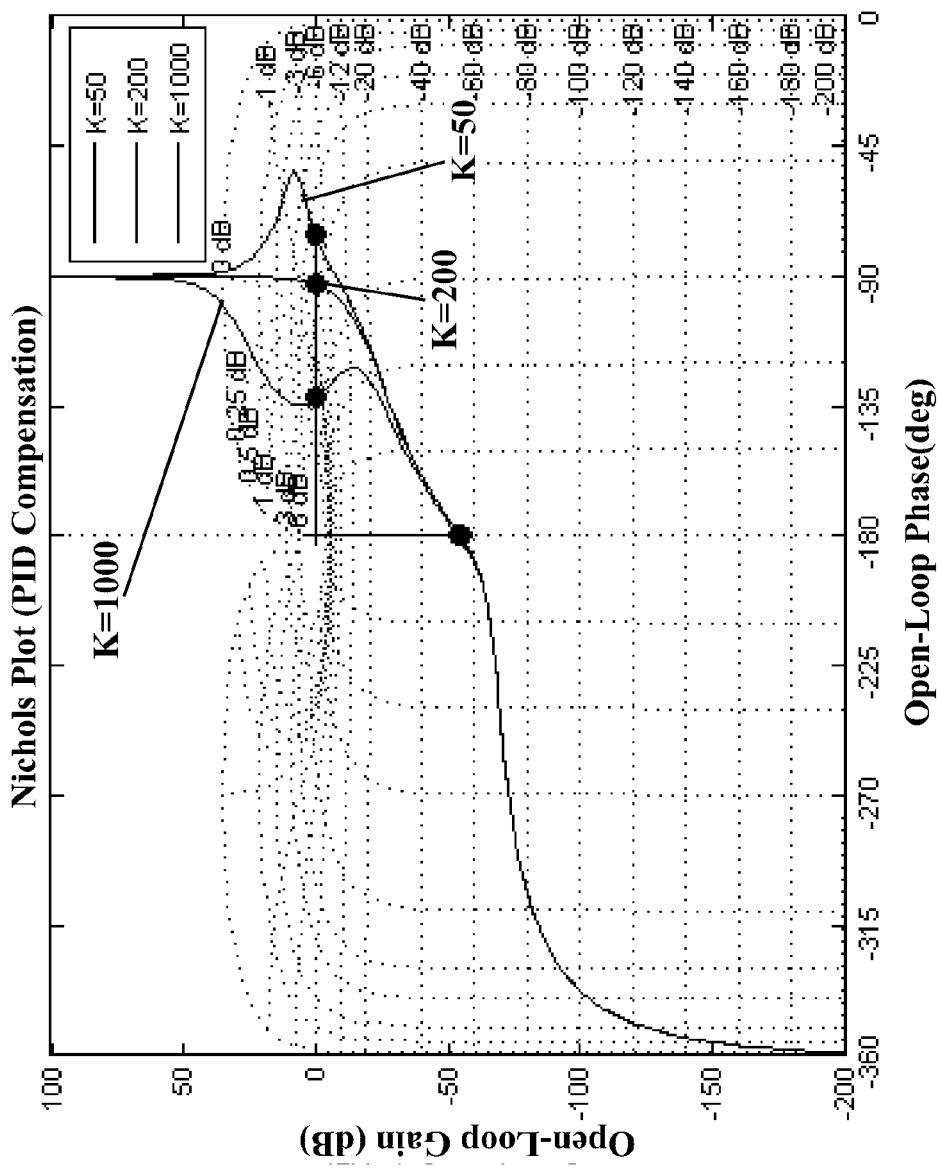

Now referring to FIG. 5A and FIG. 5B in addition to FIG. 2B, the transient response and stability of the hard disk drive servo system 34 when the servo controller 52 is a PID controller is illustrated via step response and Nichols plots. The transient response of the system demonstrates high overshoot and oscillatory behavior as the gain is increased from K=50 to K=1000. In particular, at a gain of K=200 the system rise time is approximately 0.0416 seconds. The frequency domain performance of the system demonstrates a gain margin that remains stable at approximately 54 dB as the gain is increased, while the phase margin remains between 45 and 87.1 degrees.

Figure 6A:
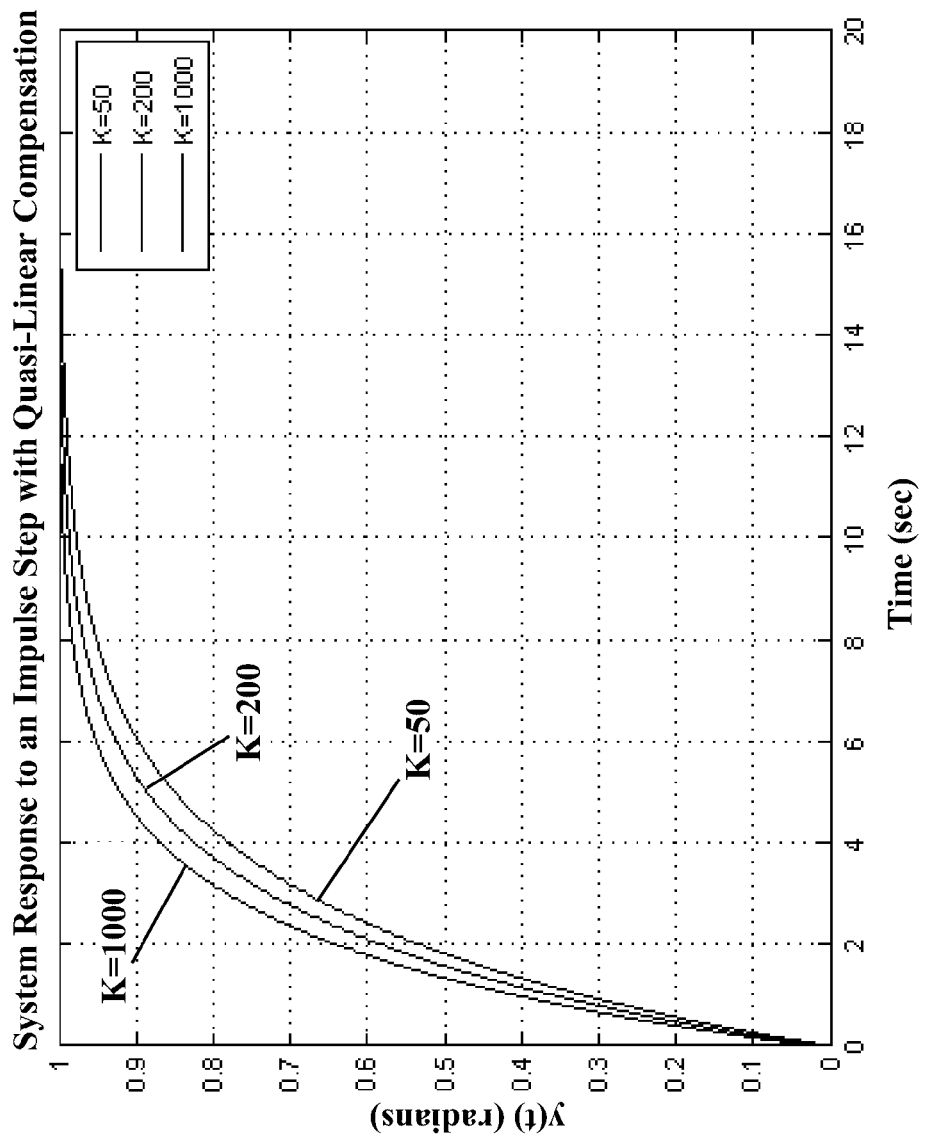
FIG. 6A is a system response plot and FIG. 6B is a Nichols plot of a comparative quasi linear controller employed as the servo controller of FIG. 2A.
Figure 6B:
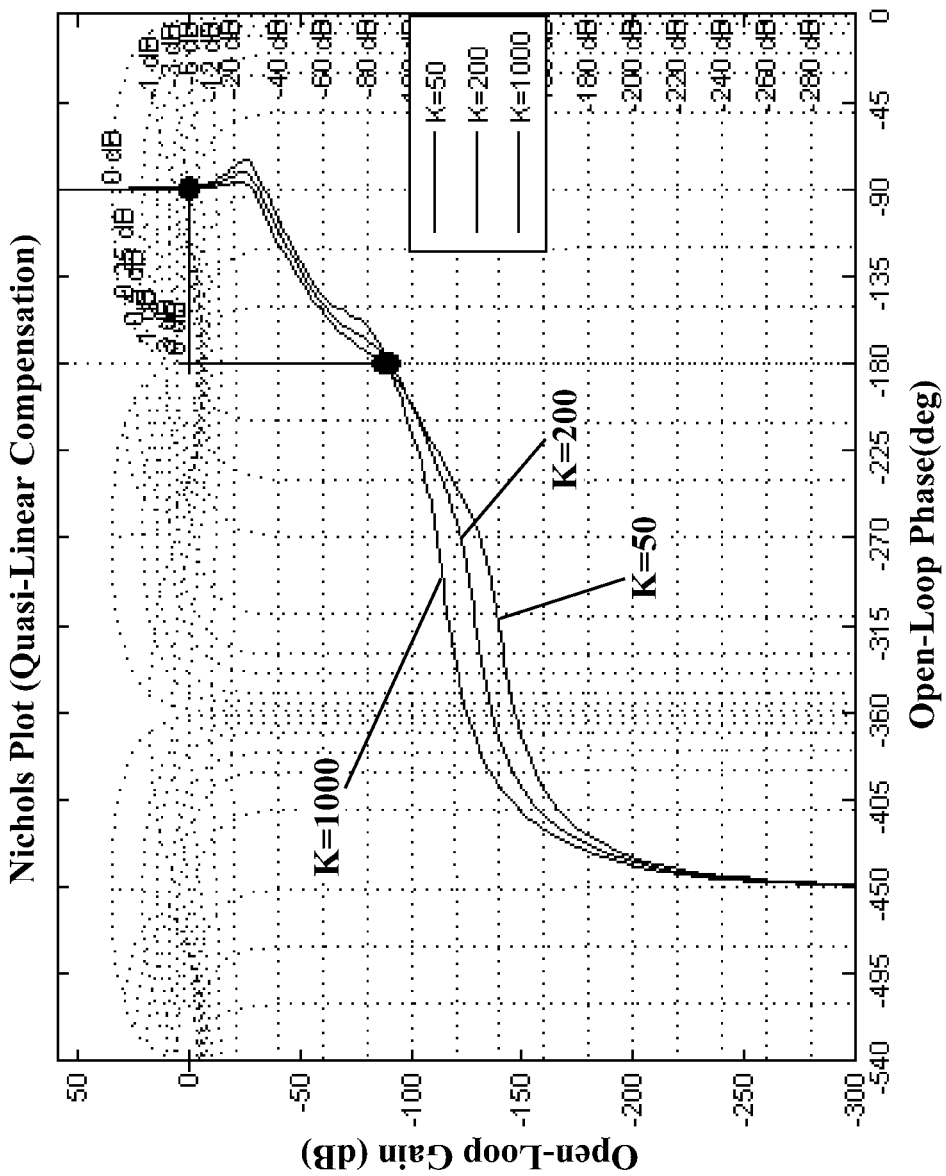

Now referring to FIGS. 6A and 6B in addition to FIG. 2B, the transient response and stability of the hard disk drive servo system 34 when the servo controller 52 is an existing quasi-linear controller is illustrated via step response and Nichols plots. The transient response of the system exhibits neither overshoot nor oscillatory behavior as the gain is increased from K=50 to K=1000. However, at a gain of K=200 the system rise time is approximately 5.12 seconds. The frequency domain performance of the system demonstrates stability margins with a gain margin at approximately 90 dB as the gain is increased, while the phase margin is negligibly affected and remains at 90 degrees between this gain increase, a direct consequence of a quasi-linear compensation technique.

A table comparing the gain margins, phase margins, rise times, settling times, bandwidth, and sensitivities of the other types of controllers to the controller of the present invention comprising gains of K=200 is provided below:

| | Comparative Table at K = 200 | | | | | |
|---|---|---|---|---|---|---|
| | GM | PM | $t_r$ | $t_s$ | $E(\omega = \omega_i)$ | |
| | (dB) | (deg) | (sec) | (sec) | $\omega_i = 5$ | $\omega_i = 25$ |
| Compensator of Present Invention | 106 | 90.3 | 0.0109 | 0.0149 | 0 | 0.02 |
| PID Compensator | 54.8 | 87.1 | 0.0416 | 0.0578 | 0.01 | 0.2 |
| Velocity Feedback Compensator | 29.4 | 48.4 | 0.0493 | 0.167 | 0 | 0 |
| Quasi-linear Compensator | 90.6 | 90.8 | 5.12 | 6.95 | 0.98 | 1 |

Clearly, the compensator of the present invention provides for significantly improved rise times and settling times, improved gain and phase margins, and improved sensitivity to external disturbances in comparison to other types of controllers when employed as a servo controller for a hard disk 36. It is generally known that the largest delay element of hard drive disk access times is the seek time, a metric which best represents positioning performance.

Figure 7A:
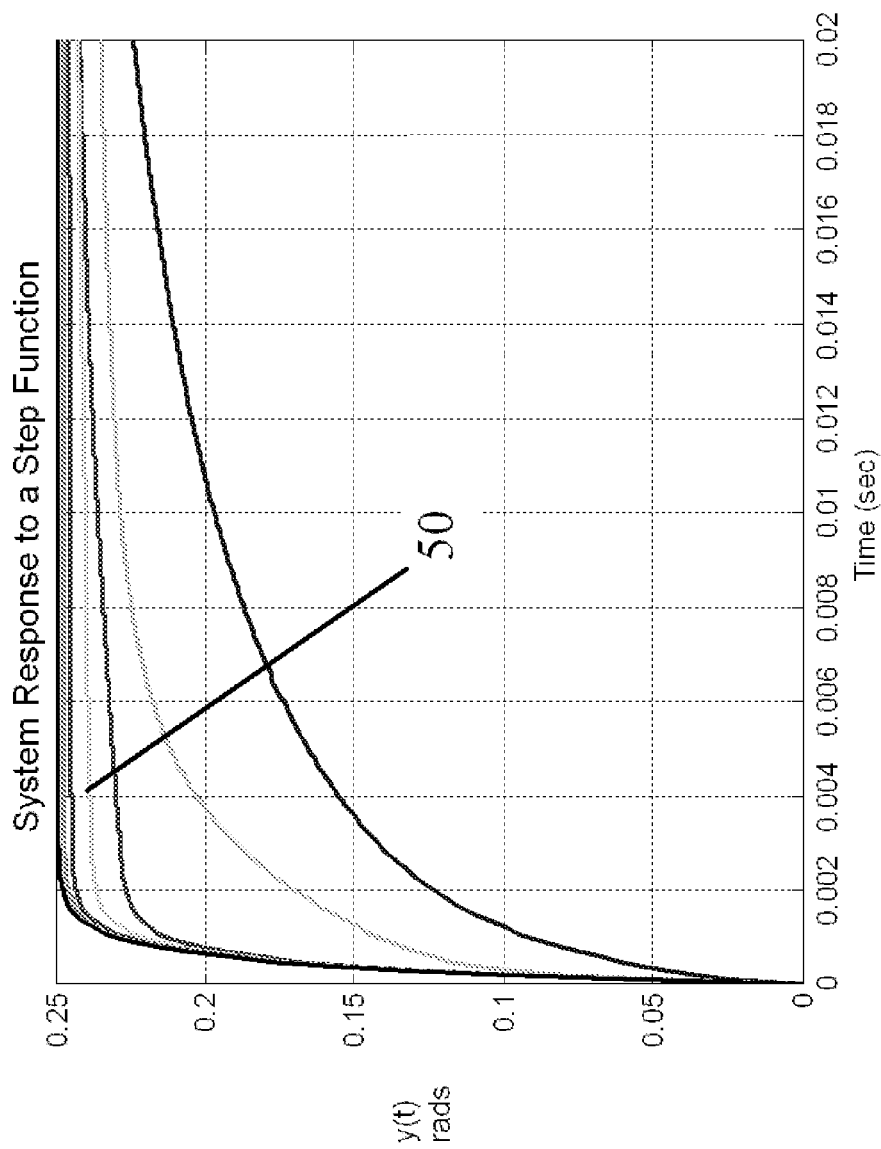
FIG. 7A is a system response plot and FIG. 7B a Nichols plot of the controller of the present invention including a phase compensating unit employed as the servo controller of FIG. 2A.
Figure 7B:
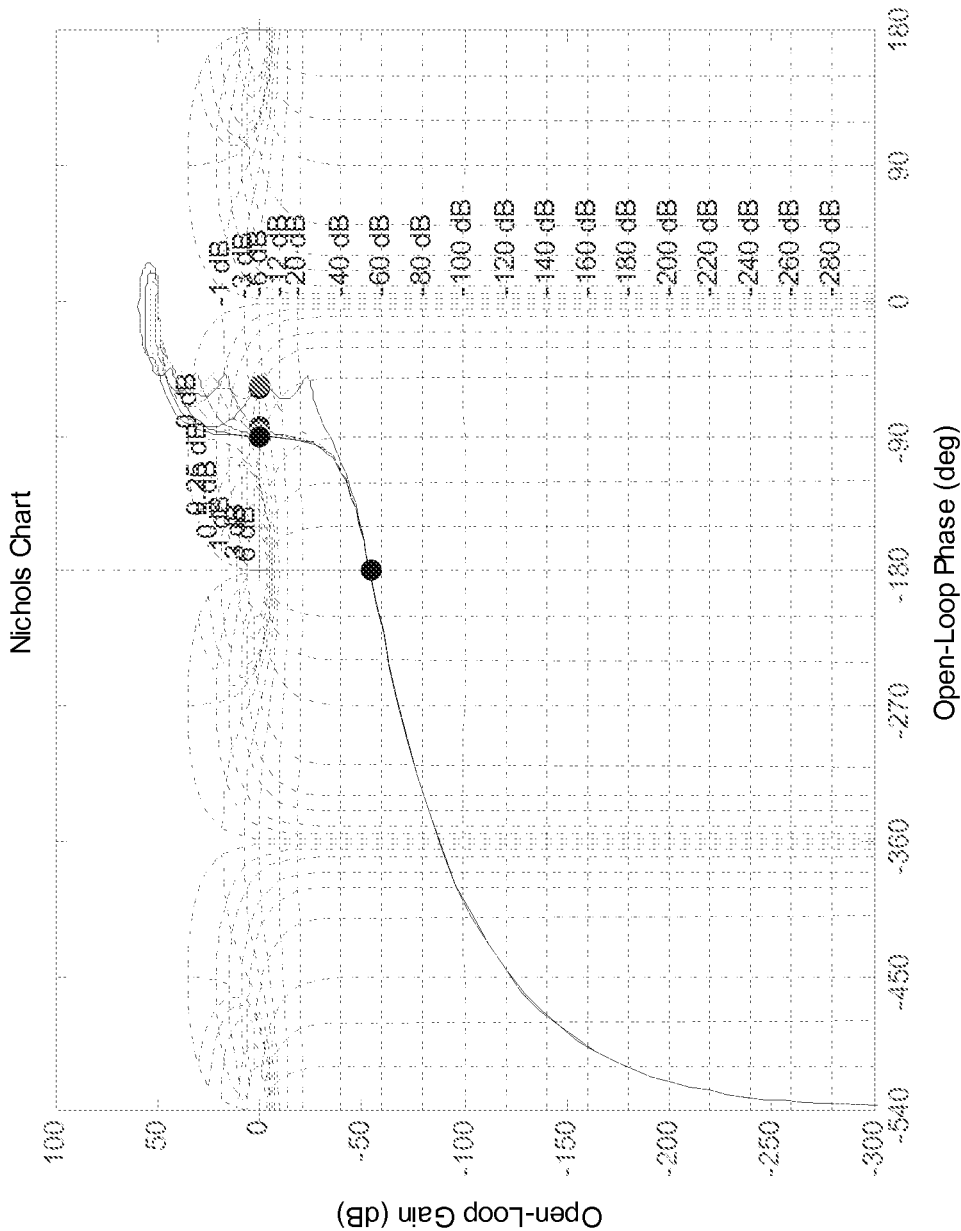

Now referring to FIG. 7A and FIG. 7B in addition to FIG. 2B, the transient response and stability of a controller of the present invention (as developed above for controlling the read-write head positioning actuator 44 of a hard disk drive 36 and in reference to FIGS. 2A and 2B) in combination with a lead/lag compensator 26 is exemplified via step response and Nichols plots. In accordance with an illustrative embodiment of the present invention, a system 12 comprising the controller 10 with a gain $k_1$ reduced to 50 (which in turns corresponds to a smaller $\omega_2$) and further comprising a $4^{th}$ order compensator 26 comprising a gain $k_c$=50, in addition to zeroes at $z_1$=0.51, $z_2$=2.55, $z_3$=101, $z_4$=150.2 and poles $p_1$=2.36, $p_2$=11.8, $p_3$=236, $p_4$=354 is provided to correct a phase shift introduced by a reduction in $\omega_2$.

In particular, the step response plot of FIG. 7A illustratively shows the response times of the system 12 comprising various phase network parameters. In particular, the time response curve 50 illustrates the response time in light of the parameters mentioned hereinabove. Of note, the gains $k_c$ and $k_1$, whose products do not necessarily result in a linear gain scaling of the system 12, can be independently tuned to optimize the system response.

Figure 8A:
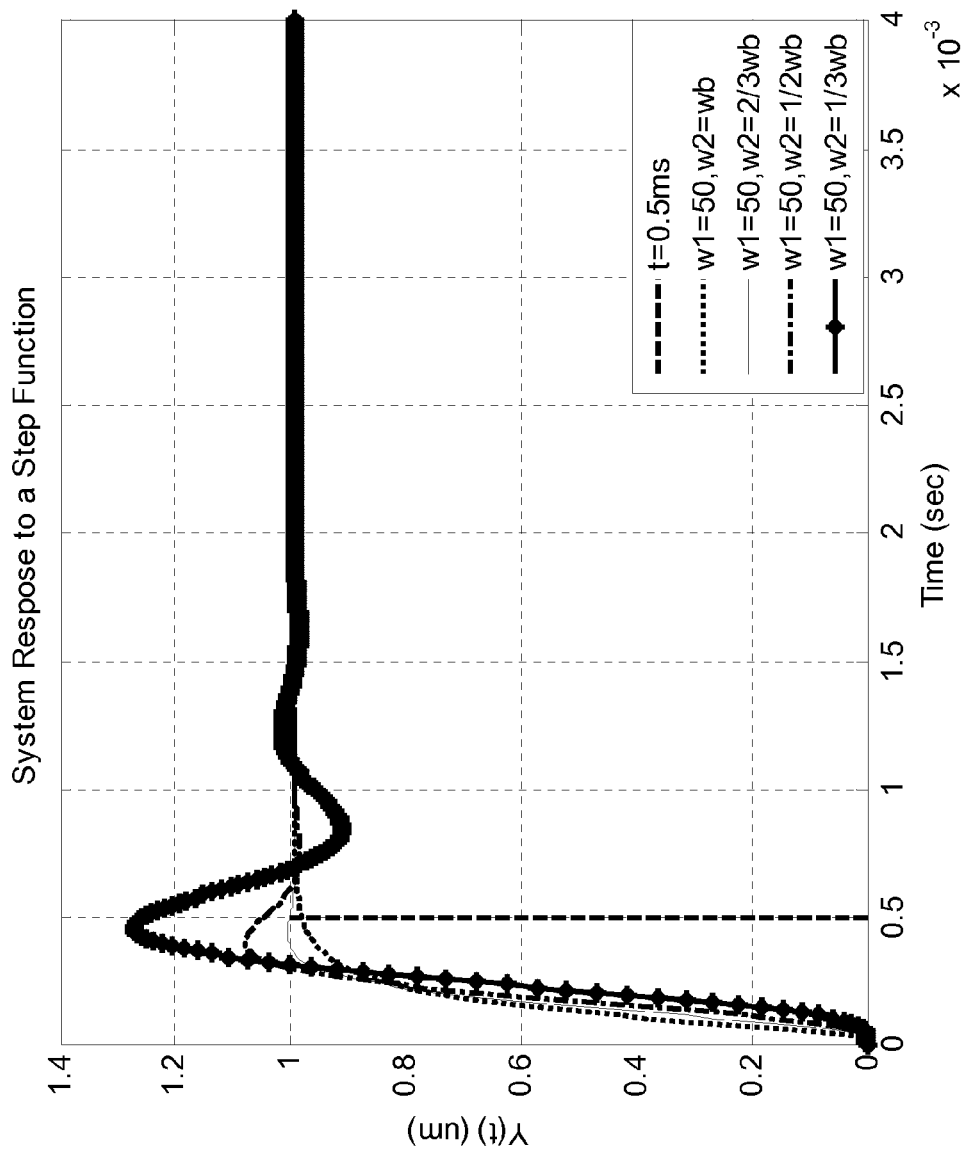
FIGS. 8A and 8B provide respectively comparative response plots of a controller of the present invention alone and including a phase compensating unit comprising a single unstable pole and a stable zero and FIG. 8C discloses the open loop plots comprising and unstable pole and a stable zero.
Figure 8B:
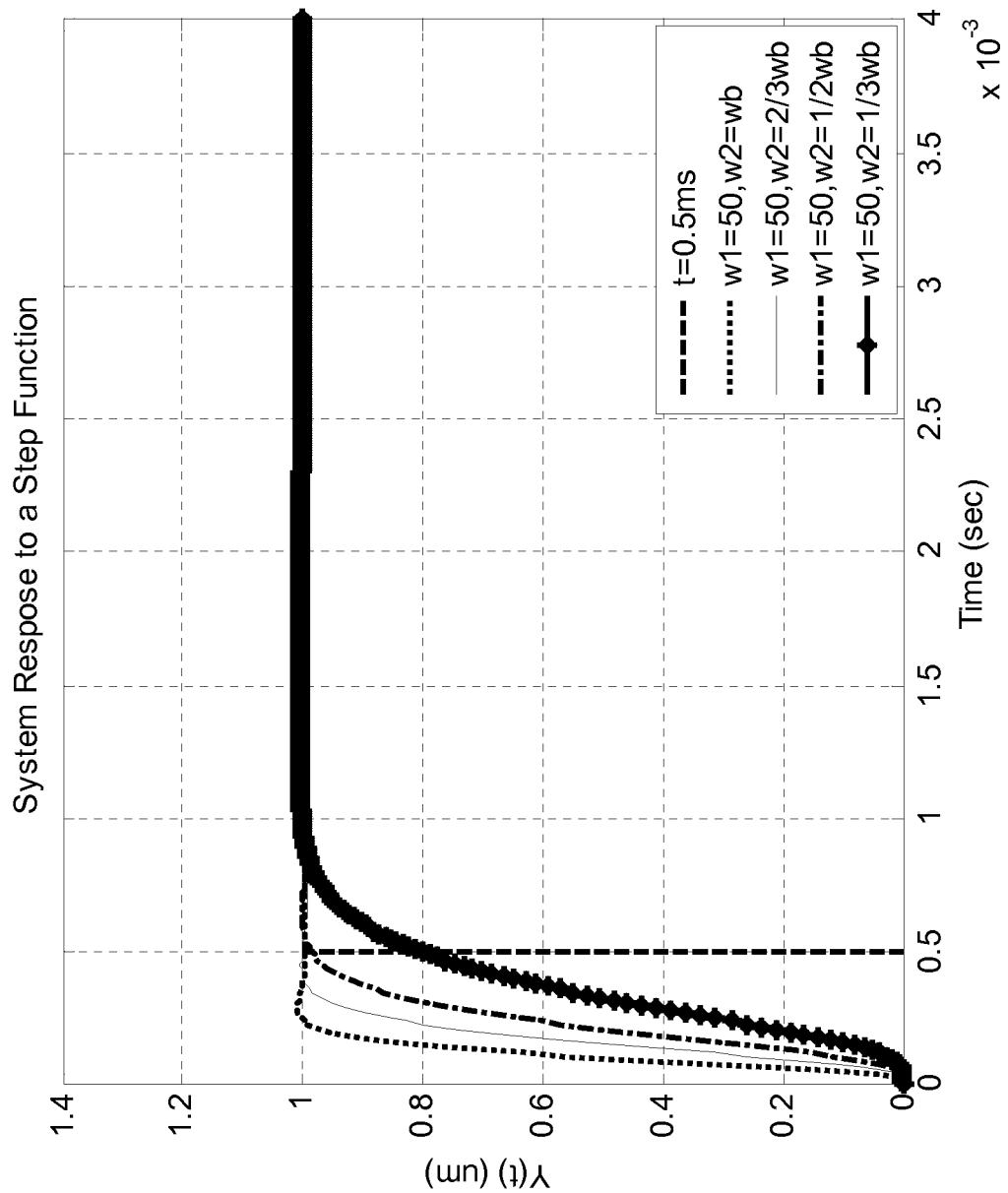
Figure 8C:
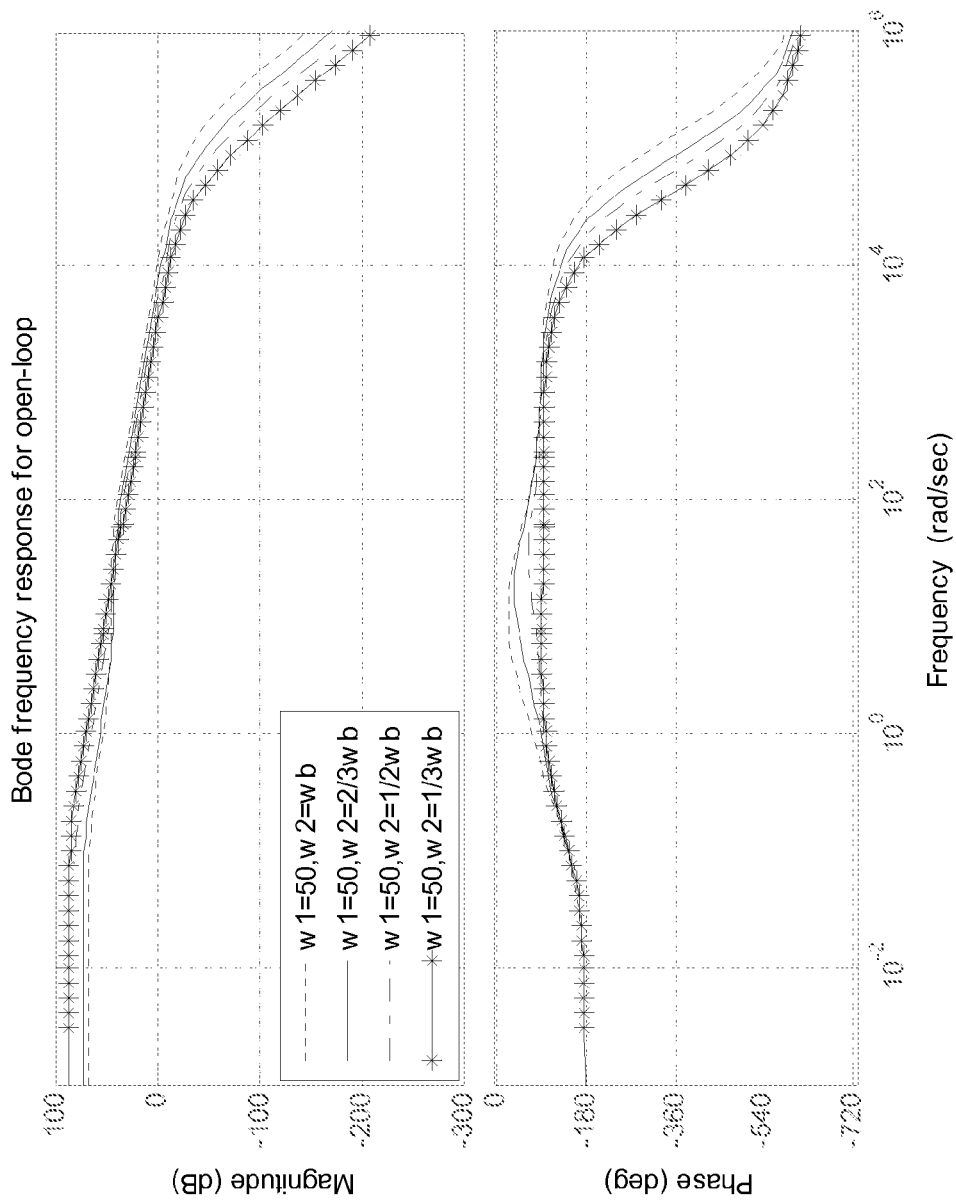

Now referring to FIG. 8A and FIG. 8B, in addition to FIG. 2B, a comparative assessment of a controller 10 of the present invention (again, as developed above for controlling the read-write head positioning actuator 44 of a hard disk drive 36 and in reference to FIGS. 2A and 2B) alone (FIG. 8A) and in combination with a phase network 28 comprising a single unstable pole and zero is provided. In particular, appropriate selection of the pole and zero (illustratively respectively 0.15 and 2) for the phase network 28 can improve time domain response while improving both gain margin, which is illustratively improved from about 7.3 dB to 14.3 dB, and phase margin, which is illustratively improved from 44.3 to 68.1 degrees (see FIG. 8C).

Clearly, in comparison with other types of controllers, the controller of the present invention provides a significant improvement in rise time over other types of controllers which translates into a significant performance increase related to reduced seek and access times. Furthermore, the controller of the present invention provides other advantages when illustratively employed as part of a hard disk drive servo system 34. For instance, the structure of the controller 10 in accordance with an illustrative embodiment described hereinabove is simple and low-order thus eliminating the requirement of complex and powerful microprocessors for its implementation, as would be required for complex higher-order controllers. The consequences of this simplicity translates into a reduction of hard disk drive unit hardware costs as well as a reduction in computational delays associated with high-order controllers further resulting in improved hard disk access times.

Additionally, as the sensitivity to disturbances is improved by the controller of the present invention the use of high cost vibration reducing mechanical components such as spindles, ball bearings, disk platters, and special vibration reducing material casings or the like may be substituted for cheaper higher vibration generating components as the controller of the present invention is able to compensate for an increase in vibration disturbances. Still further, improved position accuracy allows for a hard disk drive comprising higher track density on a disk platter. Still further, as it is generally known that the current manner by which to decrease access time is to increase rotational speed of the platter for the purpose of reducing rotational delay, a hard disk drive platter 38 controlled by a servo system 34 employing a controller 10 of the present invention would be able to spin at lower rotational speeds to achieve the same access times thus benefiting from reduced energy consumption, reduced vibration generation resulting from a higher rotation of the platter 38, and increased mean time between disk failure.

Although the present invention has been described hereinabove by way of specific embodiments thereof, it can be modified, without departing from the spirit and nature of the subject invention as defined in the appended claims.

I claim:

1. A system for controlling a linear time invariant, minimum phase, and strictly proper plant described by a plant transfer function P(s) using an input control signal u, the plant outputting a plant output signal y, the system comprising:
   a subtractor for calculating an error signal e comprising the difference between said system input signal u and said plant output signal y;
   a feedback loop for feeding the plant output signal y to said subtractor;
   a set of sensitivity requirements smaller than any positive number $\epsilon$ on a limited frequency range $\omega \leq \omega_1$ and smaller than any number M>1 on a whole frequency range; and
   a stabilizing controller/compensator described by a transfer function C(s) for receiving said error signal e and providing a compensated control signal to said plant, said controller/compensator comprising a high gain filter having a fast time response and satisfying said set of sensitivity requirements on said limited frequency range described by a transfer function of a high gain filter $J_1(s)$; and a low pass filter $J_2(s)$ for ensuring that said set of sensitivity requirements are met on said whole frequency range; wherein said controller transfer function C(s) described by:

$$C(s)=P^{-1}(s)J_1(s)J_2(s)$$

and wherein the parameters of $J(s)=J_1(s)J_2(s)$ are adjusted to satisfy $$|J(\omega)| > \left[1 + \frac{1}{\epsilon}\right]$$

over said limited frequency range and $$|J(\omega)| > \left[1 + \frac{1}{M}\right]$$

over said whole frequency range.

2. The system of claim 1, wherein said fast time response high gain filter $J_1(s)$ has the form $$J_1(s) = k_1\left(\frac{1}{s+\omega_{10}}\right)$$

and wherein $\omega_{10} \geq \omega_1$ is chosen to be high enough while the gain $k_1/\omega_{10}$ at low frequencies remains practically realizable.

3. The system of claim 1, wherein said low pass filter $J_2(s)$ has the form:

$$J_2(s) = \left[\frac{\omega_2}{s+\omega_2}\right]^k.$$

4. The system of claim 1, wherein said filter J(s) is selected such that $$\text{Re}[P(\omega)C(\omega)] > -\left(1 - \frac{1}{M}\right)$$

for all $\omega$.

5. The system of claim 1, wherein said low pass filter $J_2(s)$ has the form $$J_2(s) = \prod_{i=1}^{k} \frac{\omega_{2i}}{(s+\omega_{2i})}$$

and further comprising selecting said $\omega_{2i}$ and said k such that $$\text{Re}[P(\omega)C(\omega)] > -\left(1 - \frac{1}{M}\right)$$

for all $\omega$ and C(s) is strictly proper.

6. The system of claim 1, wherein said low pass filter $J_2(s)$ has the form $$J_2(s) = \prod_{i=1}^{k} \frac{\omega_{2i}}{(s+\omega_{2i})}$$

and further comprising selecting said $\omega_{2i}$ and said k such that the Nyquist plot does not intersect the sensitivity circle of radius 1/M centered at (−1,0) for all ω and C(s) is strictly proper.

7. The system of claim 1, further comprising a phase network compensator $G_c(s)$ of the form $$G_c(s) = k_c \prod_{i=1}^{n} \frac{s+z_i}{s+p_i}$$

where $k_c$ is a constant gain and $z_i$ and $p_i$ are respectively the stable zeros and poles of the compensator and further wherein modifying said error signal comprises modifying said error signal according to the transfer function $G_c(s)C(s)$.

8. The system of claim 5, further comprising selecting said $\omega_{2i}$ such that they are greater than an intermediate frequency $\omega_b$ selected such that $$|P(\omega)C(\omega)| < \left(1 - \frac{1}{M}\right)$$

for $\omega > \omega_b$.

9. The system of claim 1, wherein modifying said error signal comprises modifying said error signal using an unstable phase network comprising at least one unstable pole and a stable zero.

10. The system of claim 1, further comprising a compensator $G_c(s)$ of the form $$G_c(s) = k_c \prod_{j=1}^{m} \frac{s+\omega_{4j}}{s-\omega_{3j}}$$

wherein said error signal is modified according to the transfer function $G_c(s)C(s)$ prior to input into the plant and such that for all ω the Nyquist plot does not intersect the sensitivity circle of radius 1/M centered at (−1,0) in the complex plane and such that $G_c(s)C(s)$ is strictly proper.

11. The system of claim 7, further comprising a compensator $G_c(s)$ of the form $$G_c(s) = k_c \prod_{j=1}^{m} \frac{s+\omega_{4j}}{s-\omega_{3j}}$$

wherein said error signal is modified according to the transfer function $G_c(s)C(s)$ prior to input into the plant and such that for all ω the Nyquist plot does not intersect the sensitivity circle of radius 1/M centered at (−1,0) in the complex plane and such that $G_c(s)C(s)$ is strictly proper.

12. The system of claim 1, wherein said J(s) incorporates an all pass filter.

13. A system for controlling an unstable invertible linear plant described by a plant transfer function $P(s)=P_1(s)P_2(s)$ where $P_1(s)$ represents a minimum phase part and $P_2(s)$ an unstable part and further wherein $P^{-1}(s)$ is holomorphic in the right half complex plane and such that $P_2(s) \to cs^{-q}$ as $s \to \infty$, said plant P(s) using an input control signal u, the plant outputting a plant output signal y, the system comprising:

a subtractor for calculating an error signal e comprising the difference between said system input signal u and said plant output signal y;

a feedback loop for feeding the plant output signal y to said subtractor;

a set of sensitivity requirements smaller than any positive number ε on a limited frequency range $\omega \le \omega_1$ and smaller than any number M>1 on a whole frequency range;

a stabilizing controller/compensator described by a transfer function C(s) for receiving said error signal e and providing a compensated control signal to said plant, said controller/compensator comprising a high gain filter having a fast time response and satisfying a plurality of sensitivity requirements on said limited frequency range described by a high gain transfer function $J_1(s)$ having a fast time response and a low pass filter $J_2(s)$ for ensuring that said set of sensitivity requirements are met on said whole frequency and a transfer function H(s) is described by the form:

$$H(s) = \left[\frac{c}{(s+s_0)}\right]^q P(s)P_2^{-1}(s)$$

For some $s_0$ wherein said controller transfer function C(s) is strictly proper and is described by:

$$C(s) = H^{-1}(s)J_1(s)J_2(s)$$

wherein J(s) is adjusted to satisfy $$\sup_{|\omega|<\omega_1} |J(\omega)| > \left|[\inf(P(\omega)H^{-1}(\omega))]^{-1}\left[\frac{1+\varepsilon}{\varepsilon}\right]\right|$$

over said limited frequency range $|\omega| \le \omega_1$; and $$\sup_{\omega} |J(\omega)| > \left|[\inf(P(\omega)H^{-1}(\omega))]^{-1}\left[\frac{1+M}{M}\right]\right|$$

over the plant frequency range.

14. The system of claim 13, wherein said fast response high gain filter $J_1(s)$ has the form $$J_1(s) = k_1\left(\frac{1}{s+\omega_{10}}\right)$$

and wherein $\omega_{10} \ge \omega_1$ is chosen to be high enough while the gain $k_1/\omega_1$ at low frequencies remains practically realizable.

15. The system of claim 13, wherein said low pass filter $J_2(s)$ comprises a frequency $\omega_2$ and an exponent k and is described by the form:

$$J_2(s) = \left[\frac{\omega_2}{s+\omega_2}\right]^k.$$

16. The system of claim 14, wherein said low pass filter $J_2(s)$ comprises a frequency $\omega_2$ and an exponent k and is described by the form:

$$J_2(s) = \left[\frac{\omega_2}{s+\omega_2}\right]^k.$$

17. The system of claim 13, wherein said low pass filter $J_2(s)$ has the form $$J_2(s) = \prod_{i=1}^{k} \frac{\omega_{2i}}{(s+\omega_{2i})}$$

and further comprising selecting said $\omega_{2i}$ and said k such that the Nyquist plot does not intersect the sensitivity circle of radius 1/M centered at (−1,0) in the complex plane for all $\omega$, C(s) is strictly proper and the closed loop is stable.

18. The system of claim 13, further comprising a compensator $G_c(s)$ of the form $$G_c(s) = k_c \prod_{i=1}^{n} \frac{s+z_i}{s+p_i}$$

where $k_c$ is a constant gain and $z_i$ and $p_i$ are respectively the zeros and poles of the compensator and further wherein said error signal is modified according to the transfer function $G_c(s)C(s)$ prior to input into the plant and such that $G_c(s)C(s)$ is strictly proper.

19. The system of claim 13, further comprising a compensator $G_c(s)$ of the form $$G_c(s) = k_c \prod_{j=1}^{m} \frac{s+\omega_{4j}}{s-\omega_{3j}}$$

wherein said error signal is modified according to the transfer function $G_c(s)C(s)$ prior to input into the plant and such that for all $\omega$ the Nyquist plot does not intersect the sensitivity circle of radius 1/M centered at (−1,0) in the complex plane and such that $G_c(s)C(s)$ is strictly proper.

20. The system of claim 13, wherein said $\omega_{2i}$ are greater than an intermediate frequency $\omega_b$ selected such that $$|P(\omega)C(\omega)| < \left(1-\frac{1}{M}\right)$$

for $\omega > \omega_b$.

21. The system of claim 13, wherein $\omega_1$ is bigger than the right half plane poles and wherein said $\omega_{2i}$ are greater than an intermediate frequency $\omega_f$ and gain $k_1$ is increased so that that Real $\{J(\omega_f)\} \geq -1+1/M$ and Im $\{J(\omega_f)\} = 1/M$ for some value $\omega_f$, $\omega_1 \leq \omega_f < \omega_2$ and arg $\{J(\omega)\} > -\pi + \arctan(M/(M-1))$ for $\omega > \omega_f$.

22. The system of claim 13, wherein said J(s) incorporates an all pass filter.

23. A system for controlling a read-write head positioning actuator of a hard disk drive described by a linear time invariant, minimum phase, and strictly proper transfer function P(s) wherein the read-write head positioning actuator comprises an arm and a motor comprising an armature and is subject to friction and further wherein the transfer function P(s) is of the form:

$$P(s) = K_m \frac{1}{(Ls+R)} \frac{1}{(s)} \frac{1}{(Ms+b_1)} \frac{1}{\left(\frac{s^2}{\omega_n^2}+\frac{2\xi}{\omega_n}s+1\right)}$$

wherein M is the inertia of the arm, $K_m$ is the motor constant, R is the armature resistance, L is the armature inductance, $b_1$ is the friction, $\omega_n$ is the under damped angular frequency and $\xi$ is the damping ratio, using an input position reference signal r, the read-write head positioning actuator outputting an output position signal y, the system comprising:

a subtractor for calculating an error signal e comprising the difference between said input position reference signal r and said actuator output signal y;

a feedback loop for feeding the actuator output signal y to said subtractor;

a set of sensitivity requirements smaller than any positive number $\epsilon$ on a limited frequency range $\omega \leq \omega_1$ and smaller than any number M>1 on a whole frequency range; and a controller/compensator described by a transfer function C(s) for receiving said error signal e and providing a compensated control signal to said actuator, said controller/compensator comprising a high gain filter having a fast time response and satisfying said set of sensitivity requirements on said limited frequency range described by a transfer function $J_1(s)$ comprising a dominant pole $\omega_1$ and a gain $k_1$ described by the form:

$$J_1(s) = k_1 \left[\frac{\omega_1}{s+\omega_1}\right]$$

and a low pass filter for ensuring that said set of sensitivity requirements are met on said whole frequency range and that said controller/compensator transfer function C(s) is strictly proper described by a transfer function $J_2(s)$ comprising a frequency $\omega_2$ and an exponent k described by the form:

$$J_2(s) = k_1 \left[\frac{\omega_2}{s+\omega_2}\right]^k$$

wherein said controller transfer function C(s) described by:

$$C(s) = P^{-1}(s)J_1(s)J_2(s)$$

wherein the gain $k_1$, the frequency $\omega_2$, and the parameter k are adjusted to satisfy $$|J(\omega)| > \left[1 + \frac{1}{\varepsilon}\right]$$

over said limited frequency range and $$|J(\omega)| > \left[1 + \frac{1}{M}\right]$$

over said whole frequency range.

24. The system of claim 23, wherein said low pass filter $J_2(s)$ has the form $$J_2(s) = \prod_{i=1}^{k} \frac{\omega_{2i}}{(s + \omega_{2i})}$$

and further comprising selecting said $\omega_{2i}$ and said k such that the Nyquist plot does not intersect the sensitivity circle of radius 1/M centered at (−1,0) for all ω and C(s) is strictly proper.

25. The system of claim 23, further comprising a phase network compensator $G_c(s)$ of the form $$G_c(s) = k_c \prod_{i=1}^{n} \frac{s + z_i}{s + p_i}$$

where $k_c$ is a constant gain and $z_i$ and $p_i$ are respectively the stable zeros and poles of the compensator and further wherein modifying said error signal comprises modifying said error signal according to the transfer function $G_c(s)C(s)$.

26. The system of claim 23, wherein modifying said error signal comprises modifying said error signal using an unstable phase network comprising at least one unstable pole and a stable zero.

27. A method for controlling a plant having a transfer function P(s) incorporating unstable zeros and given an input signal u, the plant having an output y and a plant frequency range, wherein P(s) is an unstable and invertible plant described by the plant transfer function $P(s)=P_1(s)P_2(s)$ where $P_1(s)$ represents a minimum phase part and $P_2(s)$ such that $P_2(s) \to cs^{-q}$ as $s \to \infty$ represents an unstable part and further wherein $P^{-1}(s)$ is holomorphic in the right half complex plane, and further wherein a transfer function H(s) is described by the form:

$$H(s) = \left[\frac{c}{(s + s_0)}\right]^q P(s) P_2^{-1}(s);$$

for some value $s_0$, wherein said controller transfer function C(s) is described by:

$C(s) = H^{-1}(s) J_1(s) J_2(s)$ comprising:
 calculating a transfer function J(s) comprising the product of:
  a high gain filter $J_1(s)$ having a fast time response and a low pass filter $J_2(s)$ selected such that $|1+J(\omega)|>1/M$ for all ω and C(s) is strictly proper; and
  M>1 is selected to meet a desired sensitivity requirement over all the frequency range.

* * * * *